(12) United States Patent
Sugawara et al.

(10) Patent No.: US 7,512,344 B2
(45) Date of Patent: *Mar. 31, 2009

(54) VARIABLE DISPERSION COMPENSATOR

(75) Inventors: Toshiki Sugawara, Kokubunji (JP); Satoshi Makio, Kumagaya (JP)

(73) Assignee: Hitachi Metals Ltd., Tokyo (JP)

( * ) Notice: Subject to any disclaimer, the term of this patent is extended or adjusted under 35 U.S.C. 154(b) by 653 days.

This patent is subject to a terminal disclaimer.

(21) Appl. No.: 11/177,327

(22) Filed: Jul. 11, 2005

(65) Prior Publication Data

US 2006/0013529 A1  Jan. 19, 2006

(30) Foreign Application Priority Data

Jul. 14, 2004  (JP)  ............................. 2004-207049
Feb. 14, 2005  (JP)  ............................. 2005-036299
Feb. 15, 2005  (JP)  ............................. 2005-037623

(51) Int. Cl.
*H04B 10/12*  (2006.01)

(52) U.S. Cl. ...................... 398/147; 398/148; 398/149; 398/158; 398/159; 398/81; 385/27; 385/31; 385/129; 385/147

(58) Field of Classification Search ................ 398/147, 398/148, 158, 159, 149, 81, 79; 385/24, 385/27, 31, 3, 9, 50, 52, 129, 147

See application file for complete search history.

(56) References Cited

U.S. PATENT DOCUMENTS 6,775,434 B2 * 8/2004 Sugawara .................... 385/27
7,257,292 B2 * 8/2007 Sugawara et al. ............ 385/27

FOREIGN PATENT DOCUMENTS

JP  10-221658  2/1997

* cited by examiner

*Primary Examiner*—Hanh Phan
(74) *Attorney, Agent, or Firm*—Reed Smith LLP; Juan Carlos A. Marquez, Esq.

(57) ABSTRACT

A dispersion compensator is applicable to a WDM optical transmission system and features low loss, wideband usage, and minimum ripple. The dispersion compensator is constructed so that the light emitted from a collimator will be reflected from an etalon of a 100% single-side reflectance by arranging the etalon and a mirror in parallel or with a slight angle and then enter another collimator. Elements for achieving variable dispersion compensation by changing temperature using a heater, for example, are also provided. In addition, these dispersion compensating elements are provided in multi-stage form and the angle of the mirror and the reflectance of the etalon are optimized. Thus, it becomes possible to realize a dispersion compensator applicable to a WDM optical transmission system and featuring low loss, wideband usage, and minimum ripple.

9 Claims, 31 Drawing Sheets

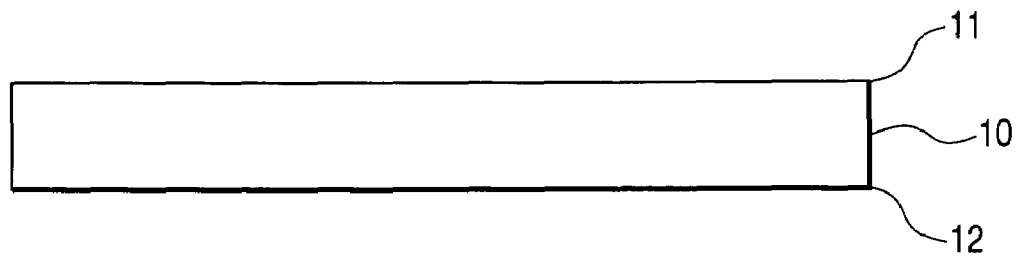
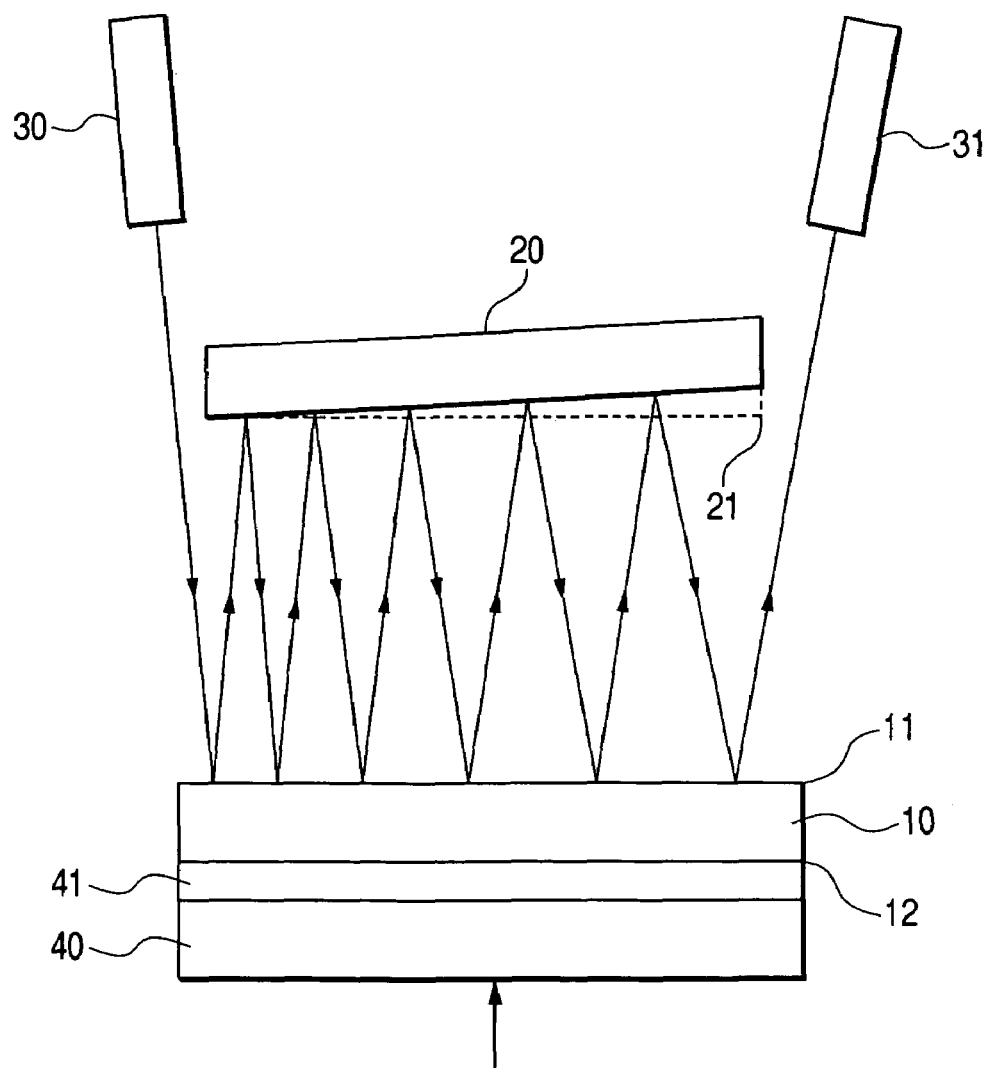

$r_1 > 61.8\%$ $r_1 < 61.8\%$

VARIABLE DISPERSION COMPENSATOR

CLAIM OF PRIORITY

The present application claims priority from Japanese applications JP 2004-207049, filed on Jul. 14, 2004, 2005-037623, filed on Feb. 15, 2005, and 2005-036299, filed on Feb. 14, 2005, the contents of which are hereby incorporated by reference into this application.

BACKGROUND OF THE INVENTION

1. Field of the Invention

The present invention relates to variable dispersion compensators, and more particularly, to optical dispersion compensators suitable for application to the optical transmission systems using optical fibers and the systems that employ an optical transmission scheme based on wavelength division multiplexing.

2. Description of the Related Art

Research and development activities on the long-distance optical transmission systems that use optical amplifiers as repeaters, have been actively performed in recent years. Enhancing capacity by WDM (Wavelength Division Multiplexing) intended for division-multiplexing plural optical signals of different wavelengths into one optical fiber that is to function as a communications transmission line is considered to be a technique effective particularly for the multimedia services represented primarily by the Internet services. In these long-distance optical transmission systems, transmission speeds and transmission distances are greatly limited by the wavelength dispersion of the optical fiber. The wavelength dispersion is an event in which optical signals of different wavelengths are transmitted through the optical fiber at different speeds. Since the spectra of the optical signals which have been modulated at high speed contain different wavelength components, these components are affected by the wavelength dispersion occurring during transmission through the optical fiber and each component reaches a receiver at the different time of day. As a result, the optical signals suffer waveform distortion after being transmitted through the fiber. The technique of dispersion compensation becomes important to suppress waveform deterioration due to such dispersion. Dispersion compensation is a method of canceling the wavelength dispersion characteristics of the optical fiber, and thus preventing waveform deterioration, by disposing at an optical transmitter, receiver, repeater, or the like, an optical element that has wavelength dispersion characteristics inverse to those of the optical fiber used as the transmission line. The research and development of dispersion-compensating fibers, optical fiber gratings, and other devices with inverse dispersion characteristics, have heretofore been conducted to obtain dispersion compensators such as the above-mentioned optical element.

Dispersion tolerance indicates the range of the residual dispersion which satisfies certain transmission quality standards (i.e., the total amount of optical dispersion of the transmission line fiber and the dispersion compensator). Since dispersion tolerance decreases in inverse proportion to the second power of the bit rate of optical signals, the dispersion compensation technique becomes more important as the transmission speed increases. For example, in a 10-Gbps transmission system, the dispersion tolerance of optical signals is about 1,000 ps/nm, so in consideration of the fact that the amount of dispersion of a single-mode fiber is about 17 ps/nm/km, the system can transmit light only through a distance up to about 60 km without using the dispersion compensation technique. The dispersion tolerance in 40-Gbps transmission is as small as about 60 ps/nm, which is about $\frac{1}{16}$ of the above, and this tolerance is equivalent to a single-mode fiber transmission distance of about 4 km. The transmission distances of the current trunk transmission lines which use optical repeaters are from several tens of kilometers to several thousands of kilometers, and thus, the amount of dispersion of the dispersion compensator used needs to be changed according to the particular transmission distance. The dispersion compensation method that has been adopted for a 10-Gbps transmission system, for example, is by, for instance, providing a dispersion compensator whose amount of dispersion can be fixed in increments from 100 ps/nm to several hundreds of ps/nm, and then determining the appropriate amount of dispersion according to transmission distance during installation. A typical method of constructing the dispersion compensator in this example is by using the dispersion compensation fiber having a wavelength dispersion of a sign inverse to that of the transmission line. Likewise, a dispersion compensator whose amount of dispersion compensation can be changed in increments from 10 ps/nm to several tens of ps/nm is considered to be necessary for a 40-Gbps transmission system. In addition, in this case, changes in the amount of dispersion compensation with changes in the temperature of the transmission line fiber cannot be ignored. Accordingly, a dispersion compensator whose amount of dispersion can be variably controlled becomes necessary.

SUMMARY OF THE INVENTION

These conventional dispersion compensators, however, have various problems. To conduct a fixed amount of dispersion compensation, a dispersion compensation fiber as long as from several kilometers to several hundreds of kilometers is required and this increases the fiber accommodation space required. Also, an extra optical amplifier is likely to become necessary for compensation for the loss of light in the dispersion compensation fiber. Additionally, the dispersion compensation fiber produces a significant optical-fiber nonlinear effect and is thus likely to distort transmission waveforms, since it is usually small in mode field diameter.

In optical-fiber gratings, a ripple with respect to wavelength is present in their beam-pass-through characteristics and wavelength dispersion characteristics, and the ripple greatly varies compensation characteristics, even for a slight change in wavelength. It is therefore known that when used for dispersion compensation, these gratings are inferior to dispersion compensation fibers in transmission characteristics. Also, there are the manufacturing-associated problems in that gratings large in the amount of dispersion or wide in wavelength band cannot be easily produced and in that gratings narrow in band require the stabilization of temperature and wavelength. In addition, with a dispersion compensation fiber, the amount of dispersion cannot be continuously made variable in terms of principle, and this makes it difficult to realize the variable dispersion compensation that continuously changes the amount of dispersion according to the particular change in the amount of dispersion in the transmission line.

For example, a scheme in which a chirped grating is generated by producing a temperature gradient in the longitudinal direction of an optical-fiber grating to implement dispersion-compensated transmission has been reported as a method of realizing continuous variable dispersion compensation using an optical-fiber grating. In this example, the variable amount of dispersion compensation can be conducted by controlling the temperature gradient. This scheme, however, poses problems associated with its practical use, because a uniform temperature gradient is difficult to obtain and thus because sufficient dispersion compensation performance cannot be obtained for reasons such as the occurrence of a ripple in wavelength dispersion. There is a publicly known example of conducting dispersion compensations by providing a temperature gradient by means of plural compact heaters, as described in, for example, Japanese Patent Laid-open No. 10-221658. This method, however, requires either a structure that involves fine-structured processing, or a sophisticated control method. An object of the present invention is to provide a variable dispersion compensator solving the above problems, which has characteristic of the minimized dispersion ripple as well as in terms of loss and loss ripple in the large-bandwidth.

The above object can be fulfilled by a variable dispersion compensator that includes: a first variable dispersion compensating unit including a plate-like first etalon with opposed first and second planes and a first mirror with a first reflection plane, the second plane of the first etalon and the first reflection plane of the first mirror being arranged facing each other and being inclined at a first angle; and a second variable dispersion compensating unit including a plate-like second etalon with opposed third and fourth planes and a second mirror with a second reflection plane, the fourth plane of the second etalon and the second reflection plane of the second mirror being arranged facing each other and being inclined at a second angle; wherein a value of a reflectance of the first plane is equal to or less than 100% and not less than 90%, a reflectance of the second plane is lower than the reflectance of the first plane, a value of a reflectance of the third plane is equal to or less than 100% and not less than 90%, a reflectance of the fourth plane is lower than the reflectance of the third plane, the second angle is equal to or greater than the first angle, and the reflectance of the fourth plane is equal to or greater than the reflectance of the second plane.

The above object can likewise be achieved by a variable dispersion compensator that includes: a first variable dispersion compensating unit including a plate-like first etalon with opposed first and second planes and a first mirror with a first reflection plane, the second plane of the first etalon and the first reflection plane of the first mirror being arranged facing each other and being inclined at a first angle; and a second variable dispersion compensating unit including a plate-like second etalon with opposed third and fourth planes and a second mirror with a second reflection plane, the fourth plane of the second etalon and the second reflection plane of the second mirror being inclined at a second angle and being arranged facing each other; wherein the first plane has a reflectance equal to or less than 100% and not less than 90%, the second plane has a reflectance lower than the reflectance of the first plane, the third plane has a reflectance equal to or less than 100% and not less than 90%, the fourth plane has a reflectance lower than the reflectance of the third plane, and after a beam of light has been entered from an interspace between the second plane and the first reflection plane, then reflected a natural number of "$n_1$" times in alternate form between the first etalon and the first mirror, and caused to exit the interspace between the second plane and the first reflection plane, the beam of light is admitted from an interspace between the fourth plane and the second reflection plane, reflected a natural number of "$n_2$" times in alternate form between the second etalon and the second mirror, and caused to exit the interspace between the fourth plane and the second reflection plane, and thus when the reflectance of the fourth plane is equal to or greater than the reflectance of the second plane and the natural number of "$n_2$" is equal to or smaller than the natural number of "$n_1$", wavelength dispersion is given to one or plural optical signals each of a different wavelength.

In addition, the above object can likewise be achieved by a variable dispersion compensator that includes: a plus-side variable dispersion compensating unit having, in a relational expression representing a dispersion relative to wavelength, a positive gradient "$a_1$" and an effective band $W_1$ of the gradient "$a_1$"; a minus-side variable dispersion compensating unit having, in the relational expression representing the dispersion relative to wavelength, a negative gradient "$a_2$" and an effective band $W_2$ of the gradient "$a_2$"; first temperature-adjusting means that shifts dispersion characteristics of the plus-side variable dispersion compensating unit in a wavelength direction; and second temperature-adjusting means that shifts dispersion characteristics of the minus-side variable dispersion compensating unit in a wavelength direction inverse to that of the plus-side variable dispersion compensating unit; wherein the gradients "$a_1$" and "$a_2$" have signs opposite to each other and are equal in absolute quantity or equal to or smaller than 0.1 in a differential relative quantity $|(a_1-a_2)/a_1|$ between the gradients.

Furthermore, the above object can likewise be achieved by a variable dispersion compensator that includes: a first collimator for admitting a beam of light from an interspace between a second plane of a plate-like etalon and a reflection plane of a mirror, the etalon having a first plane opposed to the second plane, the second plane of the etalon and the reflection plane of the mirror being inclined at angle $\Delta\theta$ ($\geqq 0$); a second collimator for receiving the beam after t he beam has been reflected in alternate form between the etalon and the mirror, then further reflected a natural number of N times on the etalon, and caused to exit from interspace between the second plane and the reflection plane; wherein, when a width of the mirror is taken as "m" and an effective beam diameter of the beam reflected the k-th time by the mirror is taken as $\omega_k$, "m" and $\omega_k$ are represented by a relational expression of "$m \geqq \Sigma \omega_k$", and when an angle of incidence inside the etalon is $\Theta$ and a position at which a loss of the light becomes a minimum when the second plane of the etalon is taken as a total-reflecting mirror in a virtual fashion is defined as a home position of the second collimator, and the second collimator is moved away from the first collimator horizontally through a distance "$x_s$" from the home position and the distance "$x_s$" is greater than 0, but smaller than $4 NL \tan(\Theta)$ where L is a thickness of the etalon.

Besides, the above object can likewise be achieved by a variable dispersion compensator that includes: a first collimator for admitting a beam of light from an interspace between a second plane of a plate-like etalon and a reflection plane of a mirror, the etalon having a first plane opposed to the second plane, the second plane of the etalon and the reflection plane of the mirror being inclined at angle $\Delta\theta$; a second collimator for receiving the beam after the beam has been reflected in alternate form between the etalon and the mirror, then further reflected a natural number of N times on the etalon, and caused to exit the interspace between the second plane and the reflection plane; wherein an angle of admission of the beam into the etalon lowers with each reflection therefrom.

The present invention makes it possible to obtain a variable dispersion compensator that offers a low-group-delay ripple, a large amount of variable dispersion, low optical loss, and low-loss ripple characteristics, over a wide band. This, in turn, allows simultaneous dispersion compensation of all optical signals during WDM optical transmission, and thus the extension of a transmission distance in a transmission system.

Simultaneous dispersion compensation is also possible for higher-order dispersions, and the use of the dispersion compensator according to the present invention allows the construction of a simplified, inexpensive optical communications system that has excellent transmission characteristics.

BRIEF DESCRIPTION OF THE DRAWINGS

FIG. 1 is an explanatory diagram of a first embodiment of the present invention, showing an etalon serving as a basic element of a variable dispersion compensator in the invention;

FIG. 2 is an explanatory diagram of the first embodiment of the present invention, showing a first configuration of the variable dispersion compensator in the invention;

DETAILED DESCRIPTION OF THE PREFERRED EMBODIMENTS

First Embodiment

Figure 3:
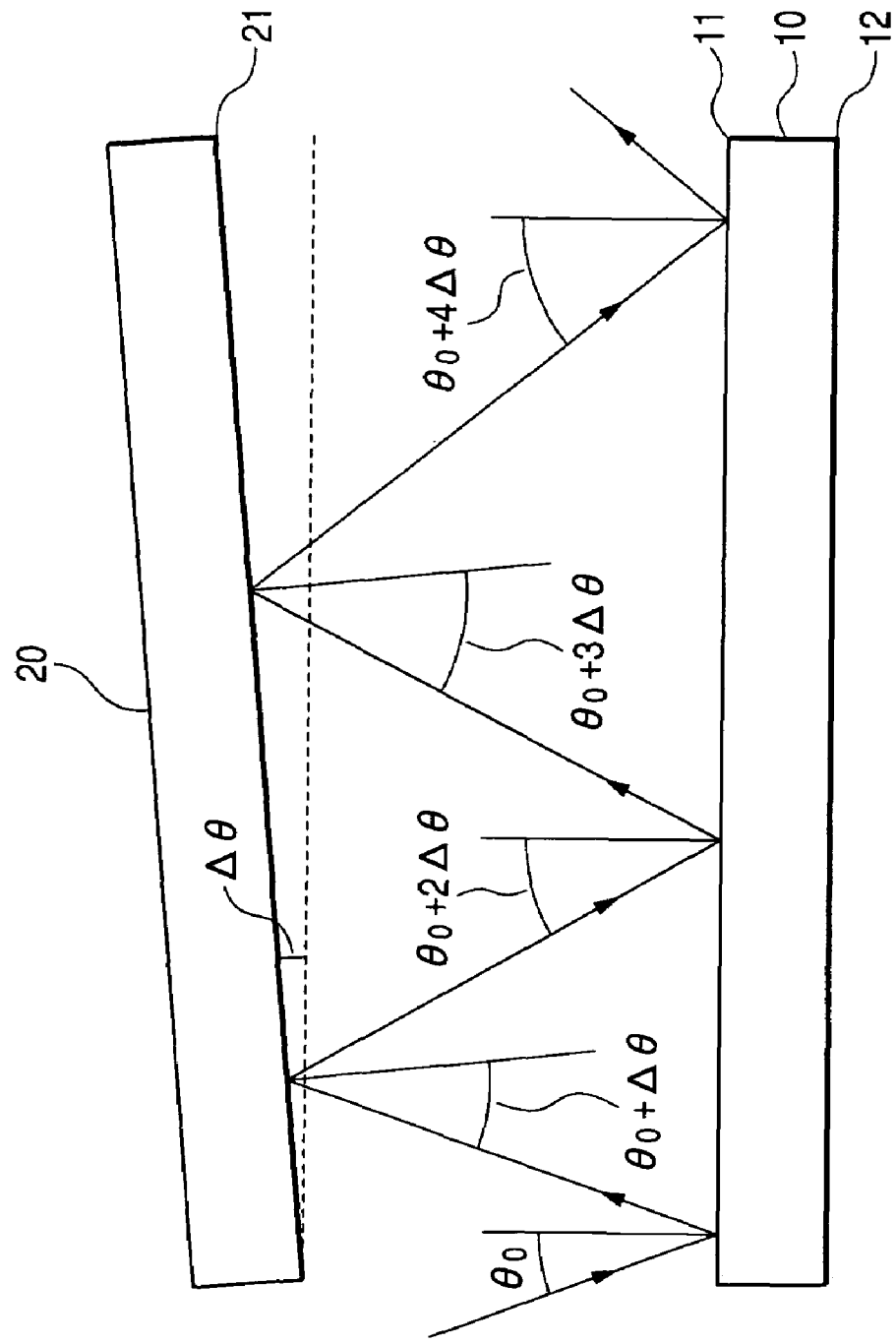
FIG. 3 is an explanatory diagram of the first embodiment of the present invention, showing in detail the first configuration of the variable dispersion compensator in the invention.

Embodiments of the present invention will be described in detail below using the accompanying drawings. First, an etalon is described. A structural view of the etalon is shown in FIG. 1. The etalon is a precisely parallelized planar plate 10 having upper and lower faces coated with reflecting films 11, 12. Metal films made of gold, silver, or other high-reflectance metallic materials, dielectric multi-layer films, or the like are used as the reflecting films. In particular, an etalon having ideally a reflectance of 100% on one face is called the GT etalon, which was named after Gires and Tournois, the proposers. In reality, however, it is difficult to obtain a reflectance of 100%, so the reflecting films may be allowed to have a reflectance of at least about 90%. In addition, the reflectance of one reflecting film does not need to be too high if the film is to be used for dispersion compensation, and as a more specific value will be shown hereinafter, the reflectance does not exceed 90%. Since the GT etalon as mentioned above has a constant transmissivity with respect to wavelength, this etalon is further called the all-pass filter. However, this etalon has wavelength dependence on phase (or group delay time). The group delay time "$\tau$" at this time is represented by the following expression:

$$\tau = \frac{\Delta T(1 - r^2)}{1 + r^2 + 2r\cos(\omega \Delta T + \phi)} \qquad \text{Numerical expression (1)}$$

where "r" denotes an amplitude reflectance, "$\omega$", the angular frequency of light, and "$\Delta T$", the round-trip delay of the cavity. Wavelength dispersion D is the group delay time "$\tau$" when it is differentiated with the wavelength.

$$D = \frac{d\tau}{d\lambda} \qquad \text{Numerical expression (2)}$$

However, to obtain high-speed signals, especially for a dispersion compensator in a 40-Gbps long-distance optical transmission system, it is important to ensure a wide effective band of 40 GHz or more, a wide variable range, and a minimum dispersion ripple. To obtain desired dispersion compensator characteristics, therefore, it is effective to reflect the light a plurality of times using a mirror. In a configuration diagram of FIG. 2, a mirror (constituted by elements 20, 21) is disposed in parallel to or at a slight angle to an etalon (constituted by elements 10, 11, 12). As a more specific value will be shown hereinafter, if this angle is about 1 degree or less, an effective-band spreading effect based on the present invention can be obtained. The mirror (20, 21) here is constructed by coating a mirror substrate 20 with a high-reflectance reflecting film 21. Light that has been emitted from a collimator 30 reflects between the etalon (10, 11, 12) and the mirror (20, 21) in an alternate fashion and then enters a collimator 31. The collimators refer to the optical components designed so that the light propagating through an optical fiber are spatially emitted as parallel beams. The etalon (10, 11, 12) can have its temperature controllable using a temperature-changing element 40. In order to obtain a uniform heat distribution of the etalon at this time, a heat transfer material 41 is interposed between the temperature-changing element 40 and the etalon (10, 11, 12). A heat transfer sheet or thermal grease is used as the heat transfer material.

Based on numerical expressions, a description of group delay characteristics is given using FIG. 3. If the angle formed by the mirror (20, 21) and the etalon (10, 11, 12) is taken as $\Delta\theta$, light that has entered at an incident angle $\theta_0$ to the etalon reflects on the mirror one time and then re-enters the etalon at an angle of $\theta i=\theta_0+2i\Delta\theta$. If the total reflection from the mirror is repeated a "k" number of times, a group delay time $\tau_{total}$ of an entire compensating unit can be calculated by repeatedly totaling a group delay time $\tau_i$ of the etalon during each reflection a (k+1) number of times.

$$\tau_{total} = \sum_{i=0}^{k} \tau_i = \sum_{i=0}^{k} \frac{\Delta T_i(1-r^2)}{1+r^2+2r\cos(\omega\Delta T_i+\phi)}$$

Numerical expression (3)

where "$\Delta T_i$" is the round-trip delay of each reflection in etalon cavity. In consideration of an incident angle, "$\Delta T_i$" is further represented by the following expression:

$$\Delta T_i = \frac{2nL\cos\Theta_i}{c}$$

Numerical expression (4)

$$n \sin \Theta_i = \sin \theta_i$$

Numerical expression (5)

where "c" is a velocity of the light, $\Theta_i$ an incident angle inside the etalon, "n" a refractive index, and L a spacing between the reflecting films of the etalon. The relationship between the incident angle inside the etalon, $\Theta_i$, and the incident angle to the etalon, $\theta i$, is represented by numerical expression (5).

Figure 4:
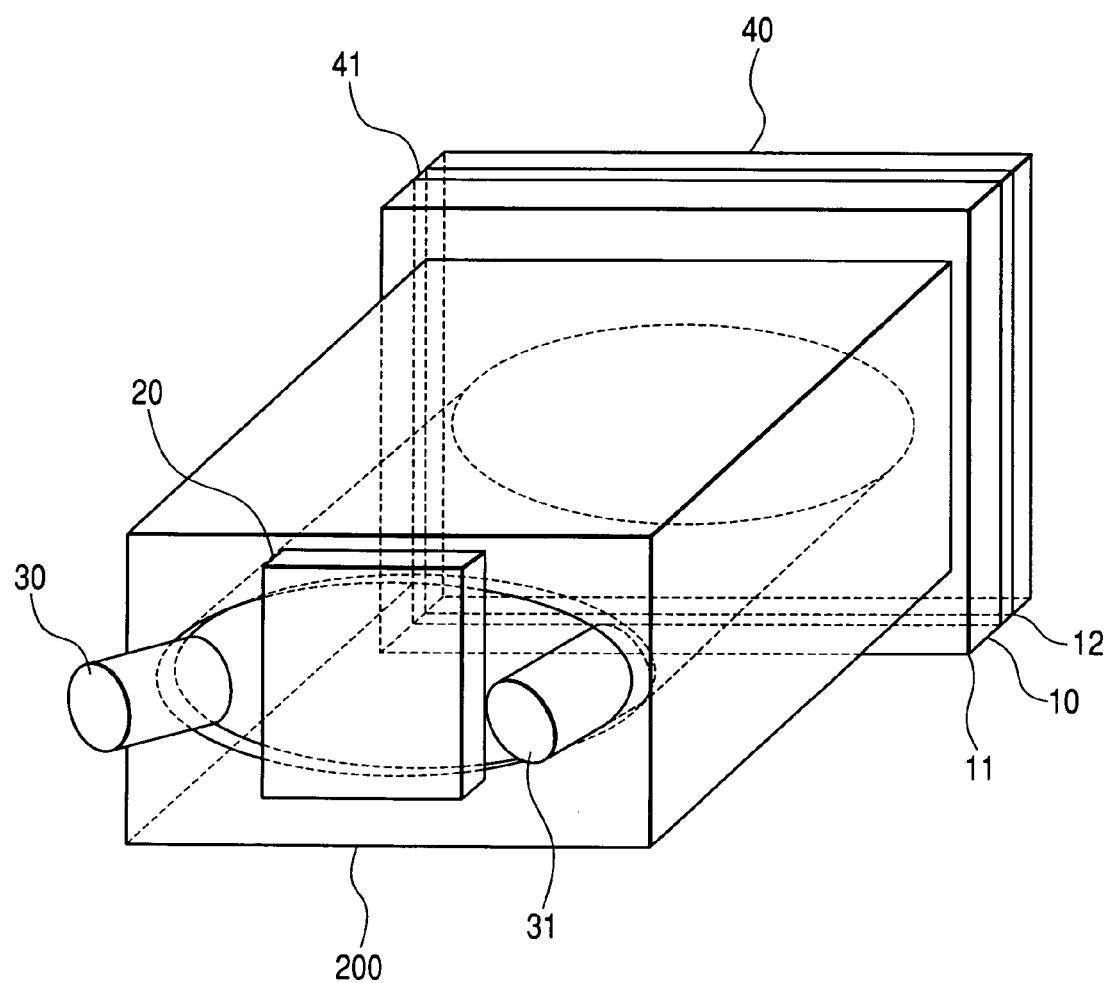
FIG. 4 is an explanatory diagram of the first embodiment of the present invention, showing the first configuration of the variable dispersion compensator in the invention stereographically.
Figure 5:
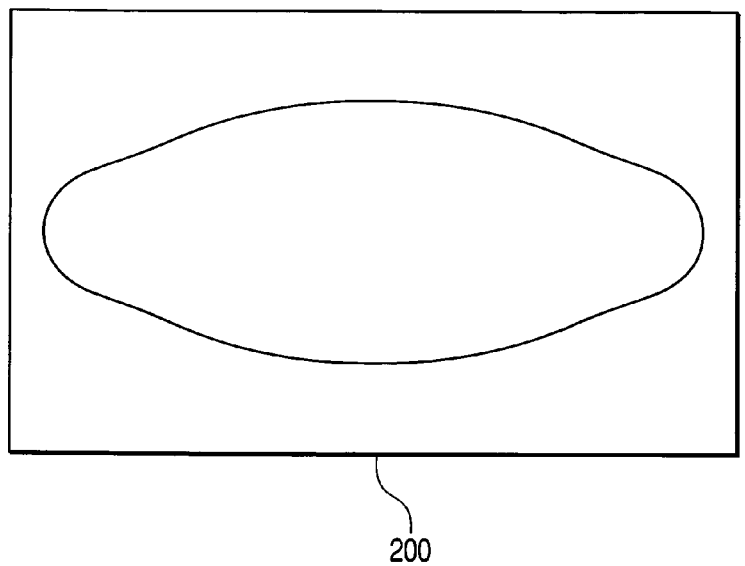
FIG. 5 is a plan view of the first embodiment of the present invention, showing an optics-fixing member provided in the first configuration of the variable dispersion compensator in the invention.
Figure 6:
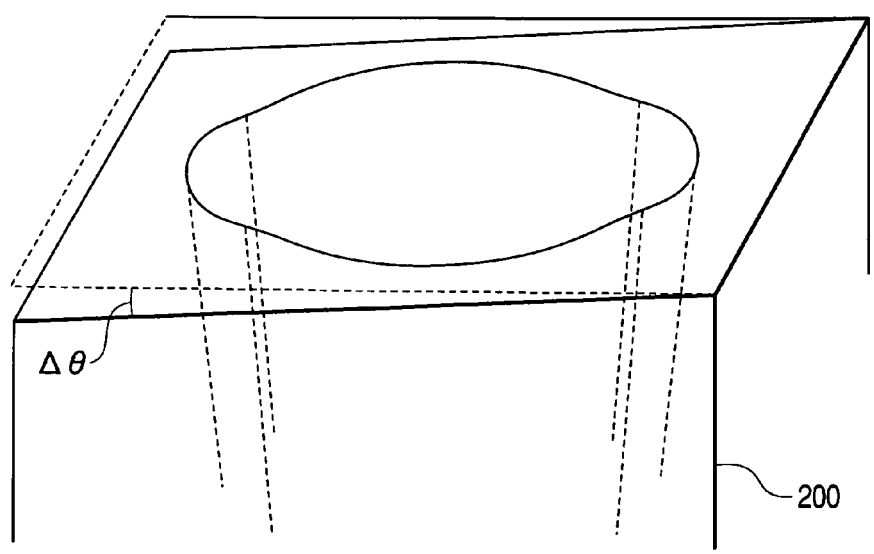
FIG. 6 is an explanatory diagram of the first embodiment of the present invention, showing a structural view of a hollow hole provided in the optics-fixing member in the first configuration of the variable dispersion compensator in the invention.

A method of controlling and fixing the etalon (10, 11, 12), the mirror (20, 21), and the collimators 30, 31 by means of an optics-fixing member 200 is shown in FIG. 4. The optics-fixing member 200 here is realized using the metal or glass that has a low thermal expansion coefficient. The optics-fixing member 200 is hollow and this member can be created by processing with an ultrasonic drill or the like. A top view of the optics-fixing member 200 is shown in FIG. 5, and an oblique top view of the optics-fixing member 200 is shown in FIG. 6. As shown in FIG. 5, the hollow hole in the optics-fixing member 200 is formed into such a shape as generated by combining three holes. One is an elliptical hole for passing a beam through, and the other two are round holes for fixing the collimators 30, 31. Also, as shown in FIG. 6, the angle $\Delta\theta$ formed by the etalon (10, 11, 12) and the mirror (20, 21) can be fixed in a precisely controlled condition by obliquely grinding an upper portion of the optics-fixing member 200. In addition, the incident angle $\theta_0$ from the collimator 30 to the etalon (10, 11, 12) can be fixed in a precisely controlled condition by precisely processing the collimator-fixing holes in a manner similar to the above. These optical components are fixed using an adhesive such as a special one for optics.

Figure 7:
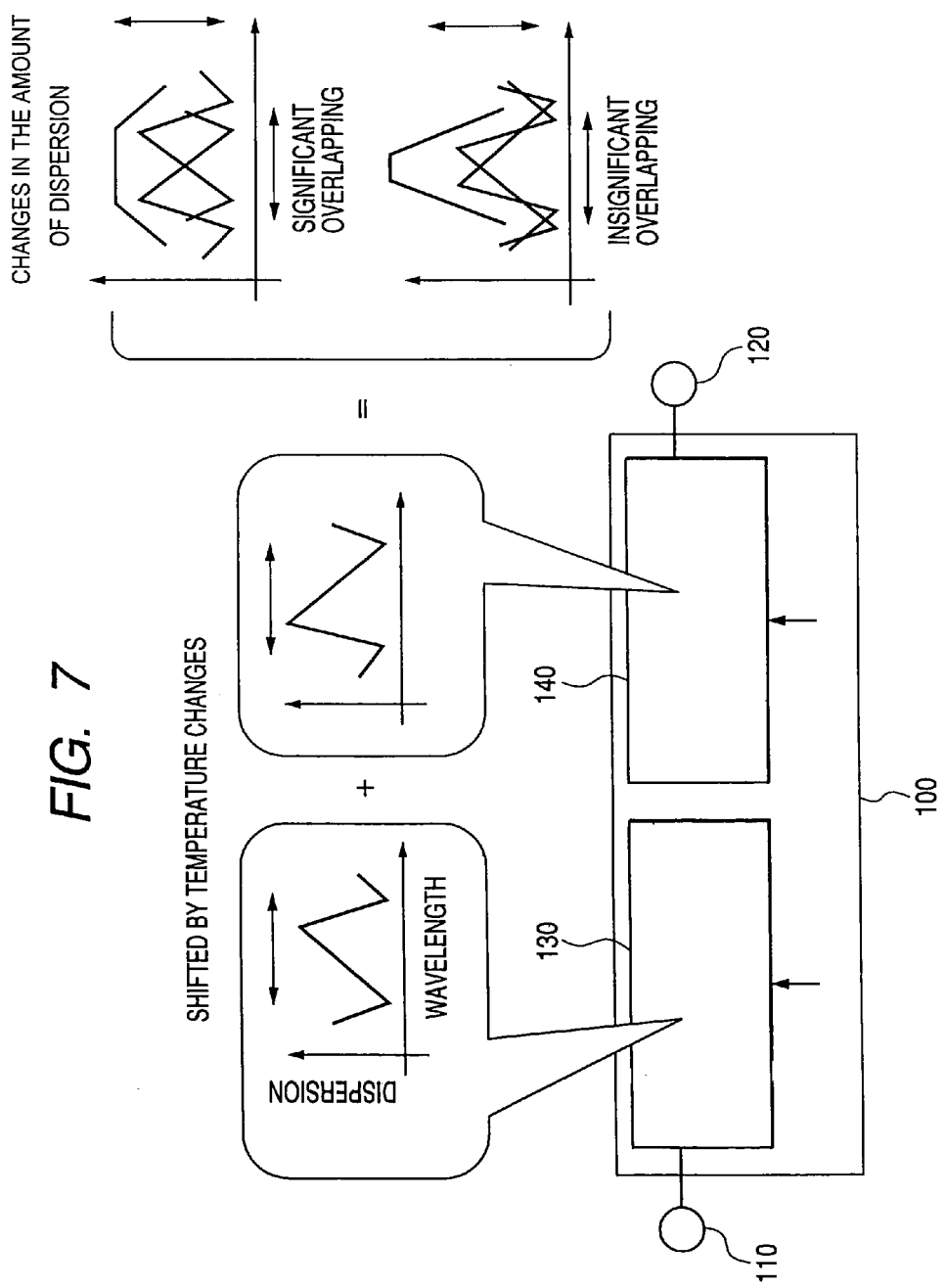
FIG. 7 is an explanatory diagram of the first embodiment of the present invention, showing the principles-of-operation and configuration of the variable dispersion compensator in the invention.

A variable dispersion compensation scheme that uses temperature control is next described using FIG. 7. Variable dispersion compensator 100 has an input port 110 and an output port 120, and is internally constituted by a plus-side variable dispersion compensating unit 130 and a minus-side variable dispersion compensating unit 140. These compensating units are realized by adopting the configuration shown in FIG. 2, i.e., the configuration where both are opposed either obliquely or in parallel with respect to the etalon (10, 11, 12) and the mirror (20, 21) and a laser beam emitted from the collimator 30 is made to reflect obliquely therebetween plural times. As shown in FIG. 7, the plus-side variable dispersion compensating unit takes a linear function that causes the relationship between dispersion and wavelength to have a positive gradient, and the minus-side variable dispersion compensating unit takes a linear function having a negative gradient. Changing the temperature of the etalon varies resonance wavelength by thermal expansion of an etalon substrate. For this reason, the dispersion characteristics shown in FIG. 7 shift in a wavelength direction. For control of the resonance wavelength at this time, it is desirable that the etalon substrate be constructed of a glass member whose thermal expansion coefficient is in the range between $10^{-6}$ and $10^{-4}$. Under the evaluation conditions that the present inventors applied, if the boron-silicated optical glass commonly used as optical glass is applied as the substrate material and this material has a thermal expansion coefficient of $0.87\times 10^{-5}$/° C., a temperature change of 60° C. is required for 100 GHz (in terms of optical wavelength, approx. 0.8 nm) of dispersion characteristics shifting. As a more specific value will be shown later in this Specification, since variable dispersion compensators require at least about 10 GHz of wavelength shifting per stage, the plus-side variable dispersion compensating unit 130 and minus-side variable dispersion compensating unit 140 whose preferable temperature control ranges are 5° C. or more are each adapted to be independently temperature-controllable. Dispersion characteristics of the entire variable dispersion compensator at this time become equal to total dispersion characteristics of the two compensating units. If a linear portion with a positive gradient and another linear portion with a negative gradient overlap significantly, the upper flat portion shown in FIG. 7 takes a wide, low shape, as shown in an upper chart of FIG. 7. Conversely, if such overlapping is insignificant, the upper flat portion takes a narrow, high shape, as shown in a lower chart of FIG. 7. Controlling the temperatures of the plus-side and minus-side variable dispersion compensating units in this way can change the amount of dispersion.

The following discusses a method for optimizing the mirror angle $\Delta\theta$ and etalon's amplitude reflectance "r" to realize ideal characteristics of the plus-side and minus-side variable dispersion compensating units. In order to implement the optimization, independent dispersion characteristics of the etalon when it differs in amplitude reflectance "r" are described first. If, in numerical expression (3), k=0 and "r"=5%, 20%, and 40%, respective dispersion characteristic curves with respect to wavelength will appear as in FIGS. 8A to 8C. First for "r"=5% in FIG. 8A, amplitude of dispersion is small and an associated curve takes a shape close to a sine function. Next for "r"=20% in FIG. 8B, the amplitude of dispersion is slightly larger than in FIG. 8A and an associated curve takes a shape close to a triangular waveform. This shape signifies characteristics close to the previously mentioned ones of the plus-side variable dispersion compensating unit. In the following description, the curve is divided into a portion having a positive gradient, and a portion having a negative gradient, and a range in which the dispersion changes from a minimum to a maximum will be called the "band of a positive gradient," and a range in which the dispersion changes from a maximum to a minimum will be called the "band of a negative gradient." Finally for "r"=40% in FIG. 8C, the amplitude of dispersion is augmented and the linear portion shown in FIG. 8B takes a distorted shape.

Figures 8A, 8B, 8C:
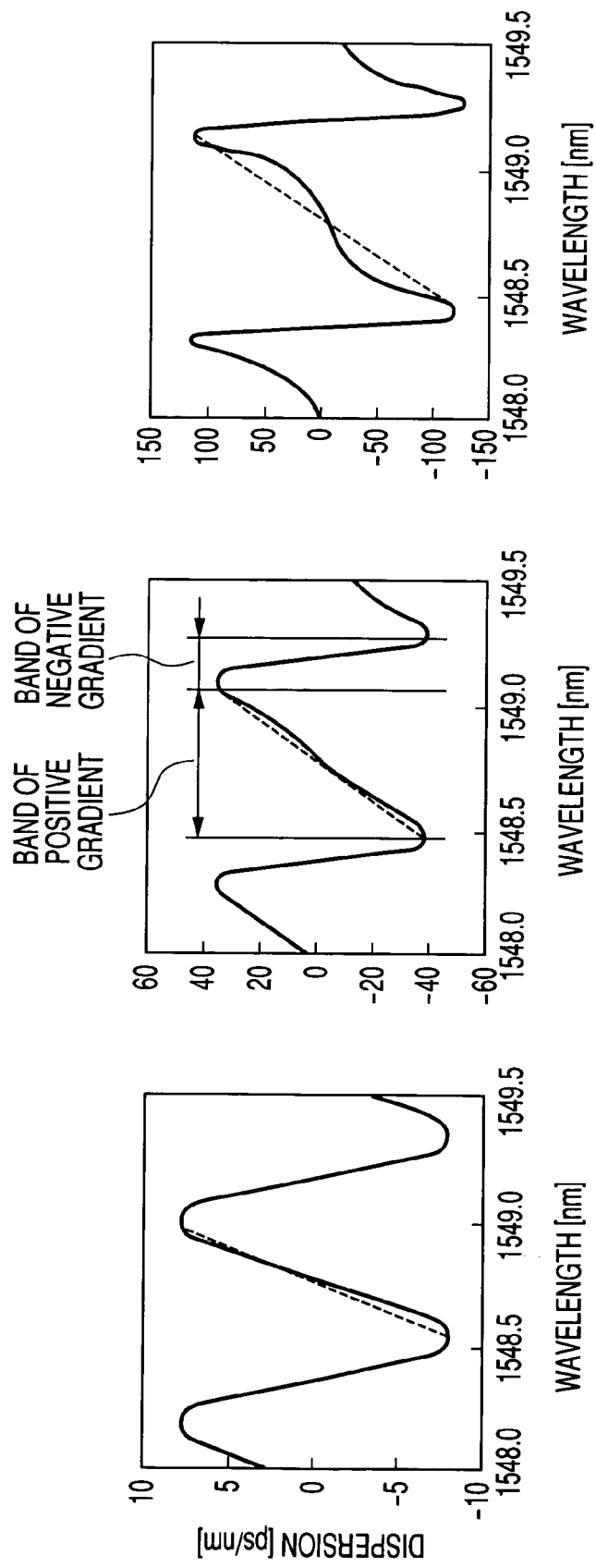
FIGS. 8A, 8B and 8C are explanatory diagrams of the first embodiment of the present invention, showing the group delay characteristics obtained from the etalon serving as a basic element of the variable dispersion compensator in the invention.

As can be seen from FIGS. 8A, 8B and 8C, the dispersion compensators using the GT etalon exhibit wavelength dependence on group delays and on dispersion characteristics. This period is called the Free Spectral Range (FSR), which, in the figures, is 100 GHz (approx. 0.8 nm). It is particularly effective in WDM optical transmission to provide such wavelength periodicity. If FSR is made equal to the wavelength interval in WDM optical transmission, the GT etalon can provide a similar effect to signals of all wavelengths. Therefore, such a dispersion compensator is very effective in a WDM optical transmission system.

Figure 9:
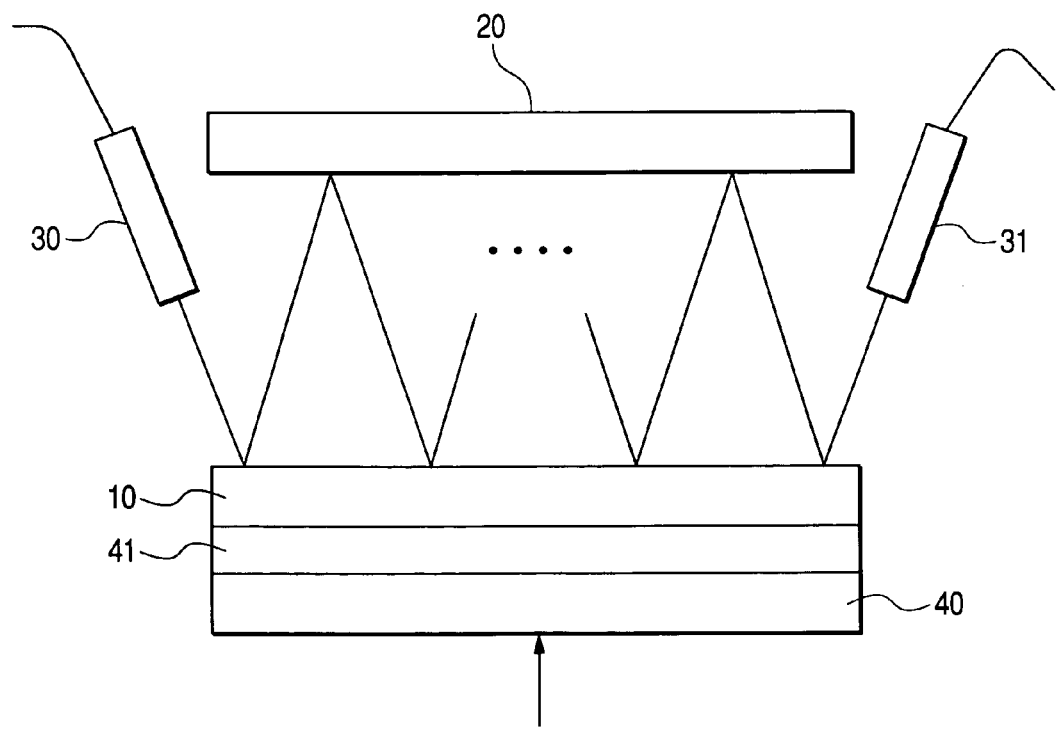
FIG. 9 is an explanatory diagram of the first embodiment of the present invention, showing a plus-side variable dispersion compensating unit of the variable dispersion compensator in the invention.

With the above-described properties in view, a description is given below of a configuration for realizing plus-side and minus-side variable dispersion compensating units according to the present invention. For the plus-side variable dispersion compensating unit, the independent characteristics of the etalon are already close to ideal ones, as shown in FIG. 8B. Simply speaking, therefore, the plus-side variable dispersion compensating unit can be realized by configuring it so that the mirror and etalon shown in FIG. 9 are made parallel to each other. In this case, squared value $R^2$ in the Pearson's product moment correlation coefficient shown in numerical expression (6) is used as an index for evaluating linearity. The "$m_{total}$" section in the expression denotes the total number of data samplings used for the evaluation, "$Y_i$" is the value used for analysis, and "$Y_i$(hat)" is the predicted value derived by regression analysis with an approximate linear approach.

In the above, "$Y_i$(hat)" indicates "$Y_i$".

"$R^2$" indicates how close to an actual value the predicted value derived using the approximate linear approach is, and takes a value ranging from 0 to 1. In this case, as the "$R^2$" value is closer to 1, the curve takes a shape closer to that of a straight line.

$$R^2 = 1 - \frac{\sum (Y_i - \hat{Y}_i)^2}{(\sum Y_i^2) - \frac{(\sum Y_i)^2}{m_{total}}}$$

Numerical expression (6)

Figure 10:
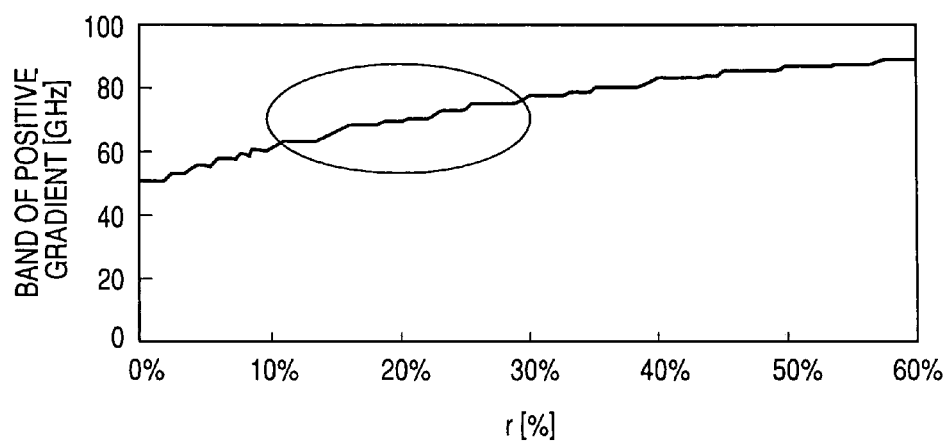
FIG. 10 is an explanatory diagram of the first embodiment of the present invention, showing the relationship between an amplitude reflectance and band of the plus-side variable dispersion compensating unit of the variable dispersion compensator in the invention.
Figure 11:
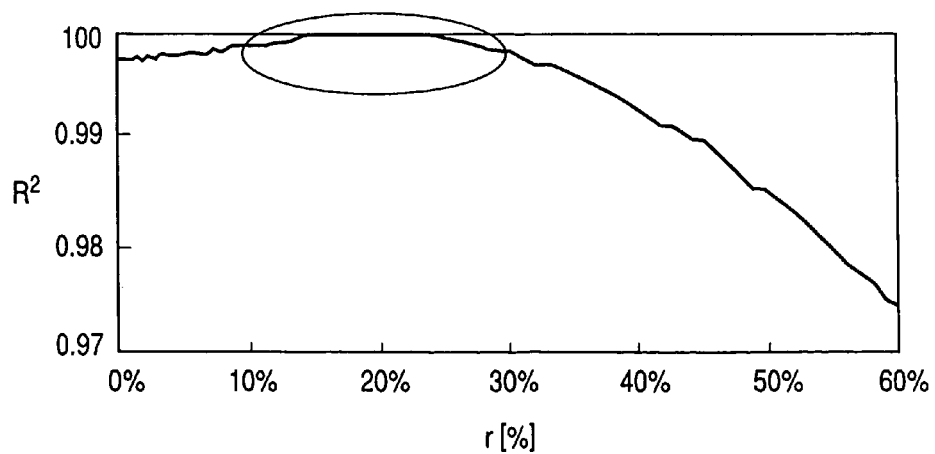
FIG. 11 is an explanatory diagram of the first embodiment of the present invention, showing the relationship between the amplitude reflectance and linearity of the plus-side variable dispersion compensating unit of the variable dispersion compensator in the invention.

When amplitude reflectance "r" is plotted on a horizontal axis and is varied from 0% to 60%, changes in "$R^2$" and in the band of the positive gradient appear as in FIGS. 10, 11. As can be seen from FIG. 11, when amplitude reflectance "r" is in vicinity of 20%, high linearity can be obtained, so it can be considered that 20% is one of the values which can be actually adopted. Also, the changes in the band of the positive gradient that are shown in FIG. 10 indicate that this band increases with "r". In order for the entire variable dispersion compensator to have flat characteristics in an effective band as shown in FIG. 7, gradients of the linear portions in the characteristic curves of the plus-side and minus-side variable dispersion compensating units need to be opposite in sign and the same in size. Therefore, it is necessary to determine the configuration of the minus-side variable dispersion compensating unit before determining a reflectance of the etalon that is to form the plus-side variable dispersion compensating unit, and the number of times the beam is to be reflected.

Figure 12:
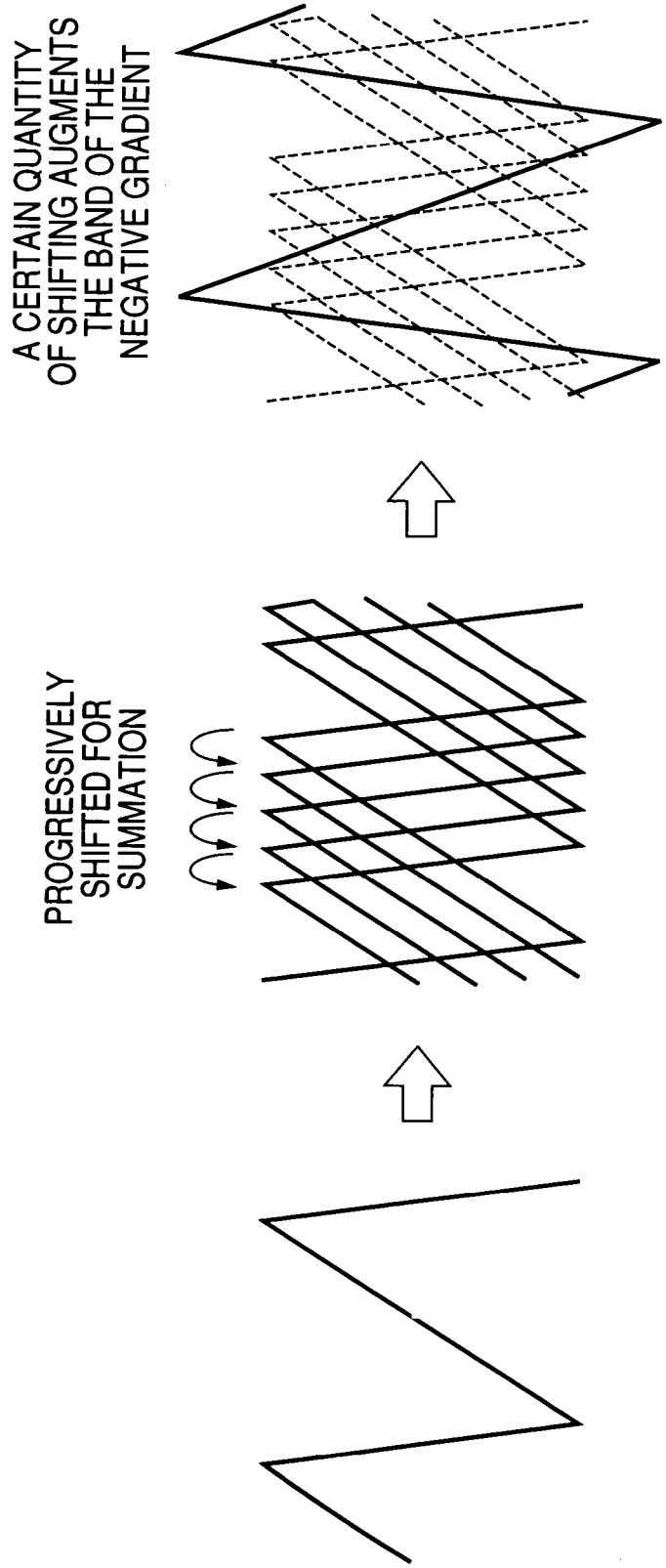
FIG. 12 is an explanatory diagram of the first embodiment of the present invention, showing a basic property of a triangular wave.
Figure 13:
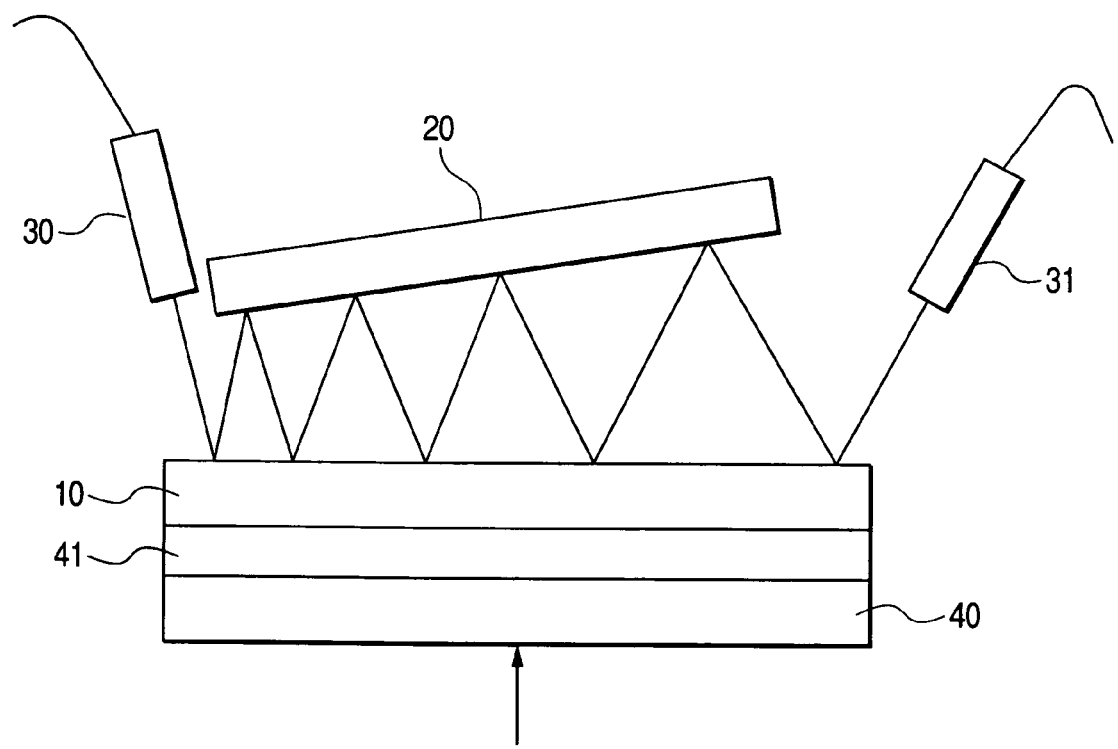
FIG. 13 is an explanatory diagram of the first embodiment of the present invention, showing a minus-side variable dispersion compensating unit of the variable dispersion compensator in the invention.
Figure 14:
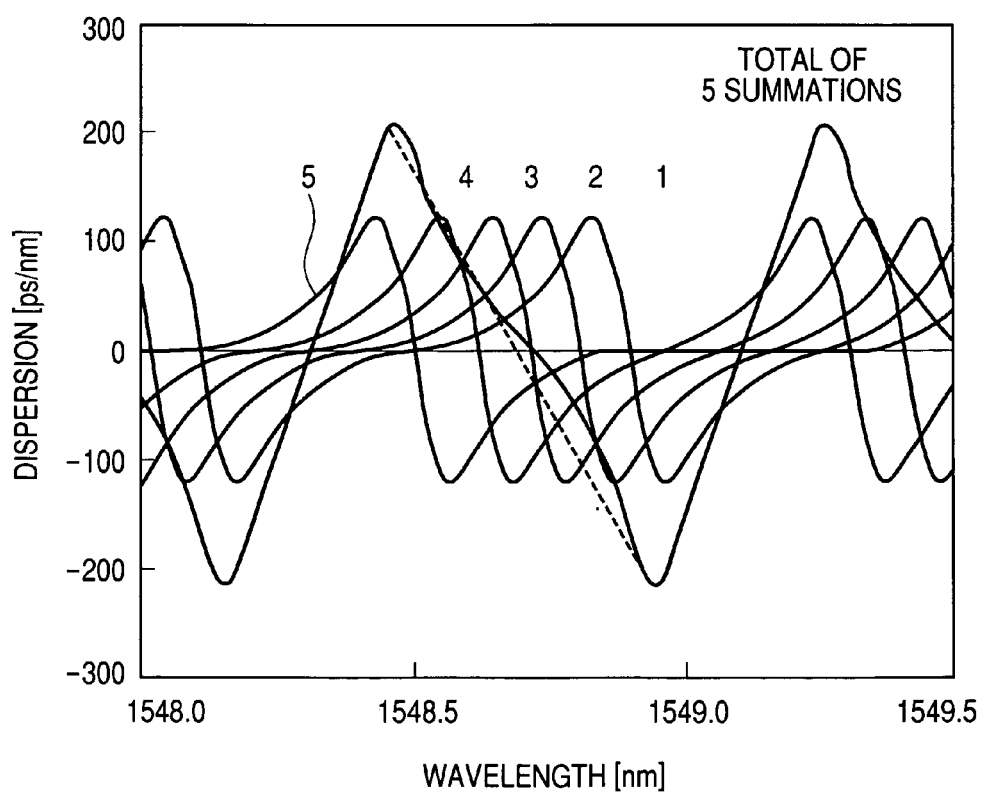
FIG. 14 is an explanatory diagram of the first embodiment of the present invention, showing the dispersion characteristics obtained in a first configuration of the minus-side variable dispersion compensating unit of the variable dispersion compensator in the invention.

The transfer function of the minus-side variable dispersion compensating unit, shown in FIG. 8A, 8B and 8C, significantly differs from an ideal one, so this problem is solved as below in the present invention. That is, the basic property of a triangular wave, shown in FIG. 12, is applied to obtain ideal characteristics with the minus-side variable dispersion compensating unit. The band of the negative gradient can be spread by shifting progressively the triangular wave that is wide in the band of the positive gradient, and summing up the resulting differential components. In this case, the optimum amount of shifting for maximum band of the negative gradient is uniquely determined from the number of summing operations and the band of the positive gradient. The band of the negative gradient can be spread by summing up the narrow portions having a negative gradient, in consideration of that property, while shifting respective peak positions using an etalon oblique reflection scheme. The peak positions can be easily shifted by connecting into a multi-stage format the plus-side variable dispersion compensating unit shown in FIG. 9, providing each of the connected compensating units with a temperature controller, and progressively shifting the dispersion characteristics obtained at each stage. However, although the band itself can be easily spread using this method, there are the disadvantages that an increase in the number of stages correspondingly increases the loss of light and thus that the number of optical components required also increases. Another method of shifting the peak positions is by giving a slight angle to the mirror and the etalon. A configuration associated with this method, and the dispersion characteristics obtained therefrom are shown in FIGS. 13 and 14, respectively. Closer studies of the triangular wave obtained at this time will allow efficient calculation by determining usable mirror angle values in the etalon oblique reflection scheme from the predetermined number of summing operations and the optimum amount of shifting that was calculated from the band of the positive gradient.

A method for further idealizing the characteristics of the minus-side variable dispersion compensating unit, compared with those obtainable in the configuration of FIG. 13, will be next described. Compared with the ideal characteristics denoted as a straight dotted line in FIG. 14, the dispersion characteristics obtained in FIG. 14 suffer slight distortion. This is because the original characteristics of the etalon, shown in FIGS. 8A, 8B and 8C, have distortion different from that of the triangular wave. Two methods are available to achieve a greater amount of dispersion, particularly in the etalon oblique reflection scheme. One is by enhancing the amplitude reflectance "r" of the etalon, and one is by adopting a multi-stage etalon oblique reflection scheme. The former is preferable in terms of loss. However, enhancing the amplitude reflectance "r" of the etalon will correspondingly augment the distorted component in comparison with that of the triangular wave. Thus, the method of using the property of the triangular wave, shown in FIG. 12, will not be properly applicable. In FIG. 14, dispersion characteristics at the amplitude reflectance "r" of 40% of the etalon are shown and $R^2$ in this case is 0.99831.

Figure 15:
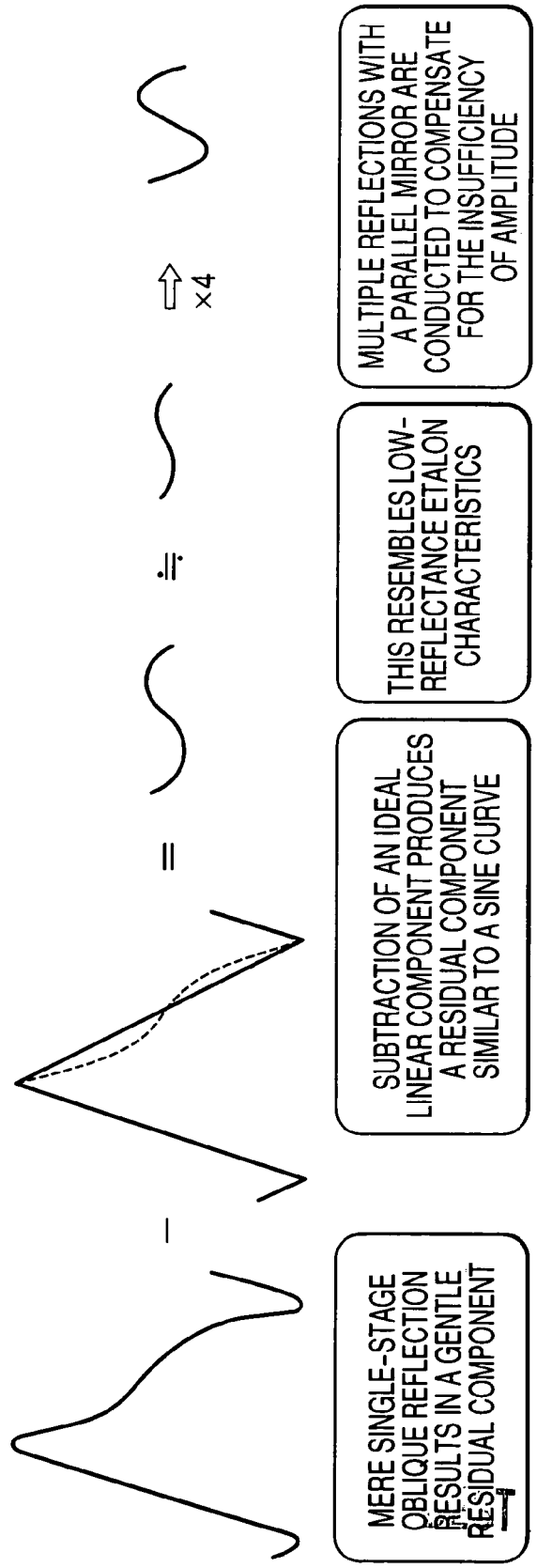
FIG. 15 is an explanatory diagram of the first embodiment of the present invention, showing the principles of operation of the minus-side variable dispersion compensating unit of the variable dispersion compensator in the invention.
Figure 16:
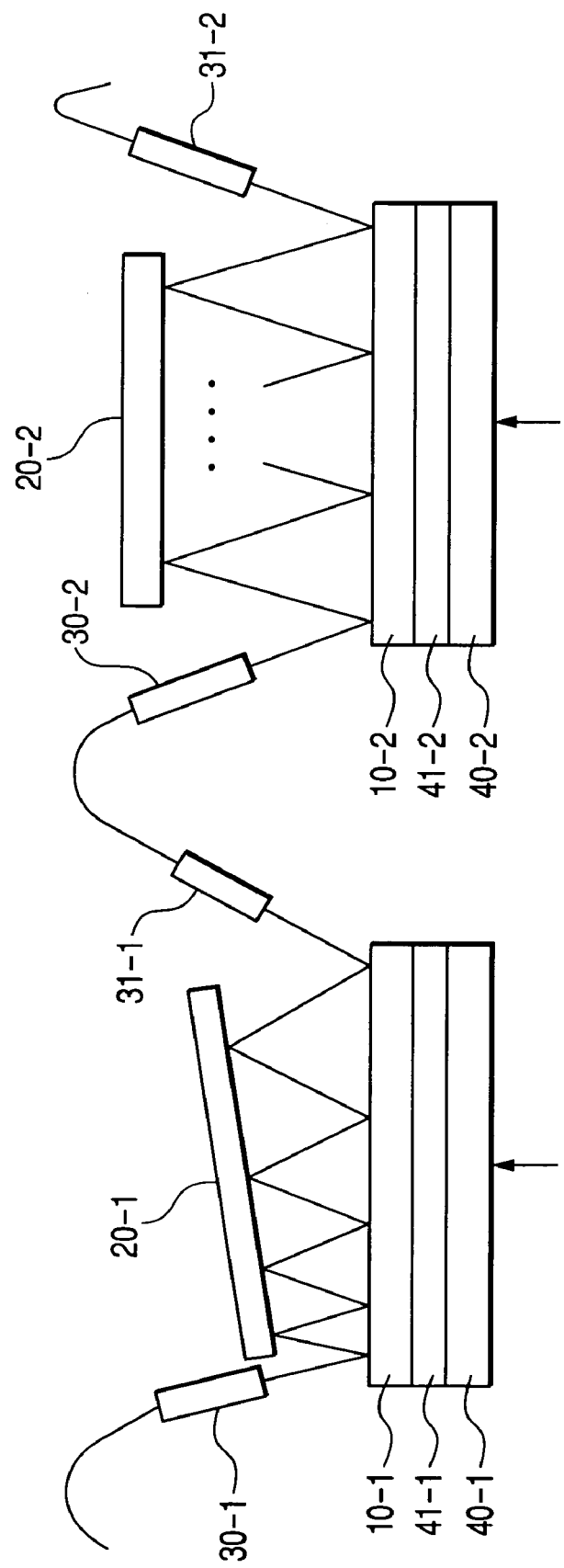
FIG. 16 is an explanatory diagram of the first embodiment of the present invention, showing a second configuration of the minus-side variable dispersion compensating unit of the variable dispersion compensator in the invention.
Figure 17:
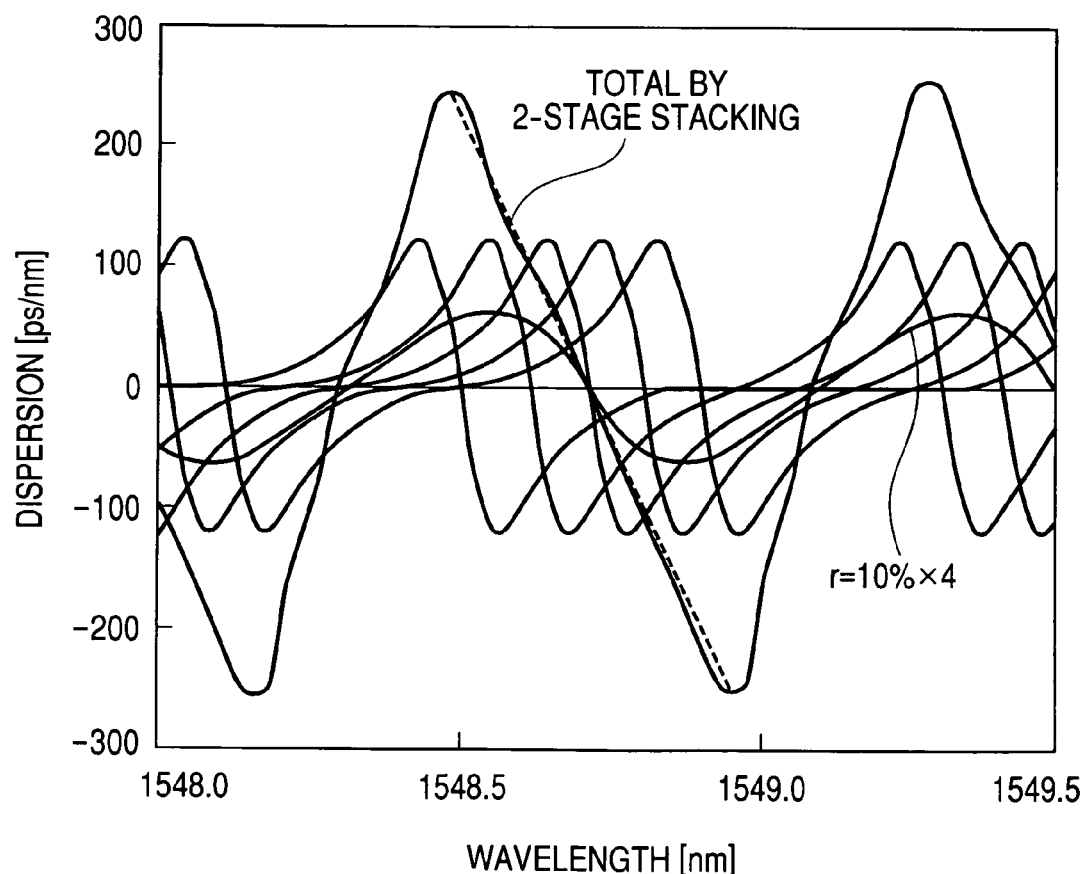
FIG. 17 is an explanatory diagram of the first embodiment of the present invention, showing the dispersion characteristics obtained in the second configuration of the minus-side variable dispersion compensating unit of the variable dispersion compensator in the invention.

A description will be below made of a method of further improving the linearity of the portions of the negative gradient in the minus-side variable dispersion compensating unit. This method focuses attention on the fact that a difference between the characteristics of FIG. 14, obtained in a single-stage oblique reflection scheme, and ideal linearity, takes a shape close to a sine curve (hereinafter, such a difference is called the high-order dispersion ripple). This difference is considered to take a shape close to that obtained when the etalon shown in FIG. 8A has a low reflectance (e.g., "r"=5%). When the reflectance of the etalon is low, however, the amplitude of dispersion is also small, as mentioned above. To conduct corrections with the etalon of a low reflectance, therefore, the etalon and the mirror are to be arranged in parallel and plural reflections are conducted to increase the amplitude up to reflection times. The above considerations and improvement method are schematically shown in FIG. 15. Next, the more specific configuration of the minus-side variable dispersion compensating unit that uses the method of FIG. 15 and associated calculation results on this compensating unit are shown in FIGS. 16 and 17, respectively. The results shown in FIG. 17 were obtained under the following configuration conditions. That is, the angle formed by an etalon 10-1 and a mirror 20-1 is 0.051°, an etalon 10-2 and a mirror 20-2 are arranged in parallel, amplitude reflectances "r" of the etalon 10-1 and the mirror 20-1 are 40% and 10%, respectively, and reflection is repeated 5 times and 4 times, respectively. As a result, a band of 58 GHz and $R^2$ of 0.99996 are obtainable and linearity can be substantially improved. In the dispersion compensator of the present invention, the order of entry and exit of light may be reversed. In other words, in the configuration of FIG. 16, light may be passed through collimators 30-1, 31-1, 30-2, and 31-2, in that order, or collimators 31-2, 30-2, 31-1, and 30-1, in that order. Also, light may be allowed to enter either the etalon 10-1 or 10-2 first.

Figure 30:
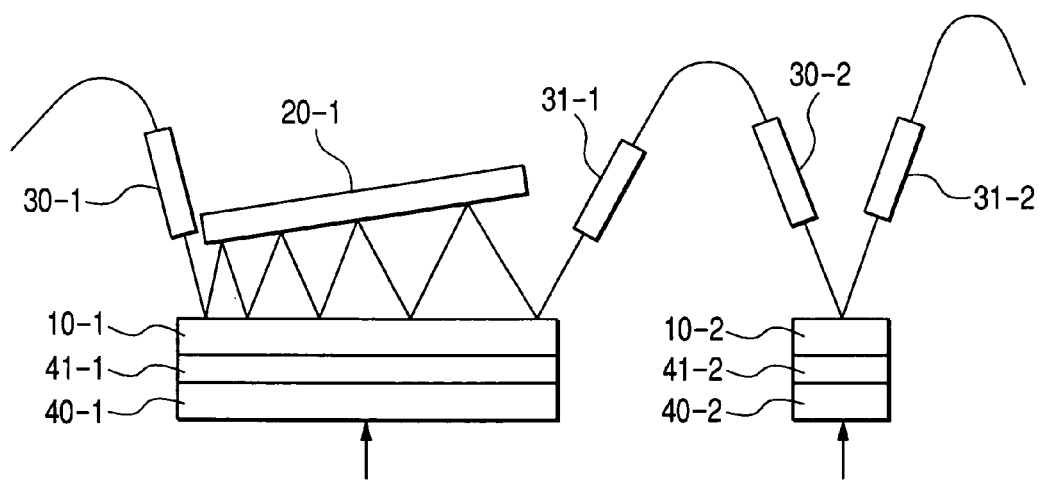
FIG. 30 is an explanatory diagram of the first embodiment of the present invention, showing a third configuration of the minus-side variable dispersion compensating unit of the variable dispersion compensator in the invention.
Figure 31:
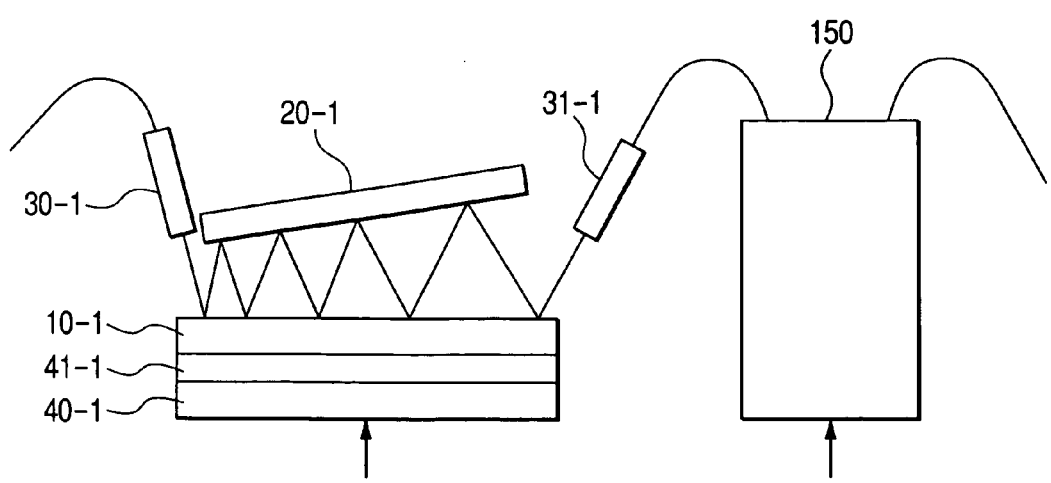
FIG. 31 is an explanatory diagram of the first embodiment of the present invention, showing a fourth configuration of the minus-side variable dispersion compensating unit of the variable dispersion compensator in the invention.

In the above cases, to conduct corrections with the etalon of the lower reflectance, this etalon may also be allowed to cause reflection one time only. The configuration in this case is shown in FIG. 30. In this case, no mirrors are required since the etalon is not made to cause plural reflections. In addition, similarly to the configuration shown in FIG. 16, light may be passed through either in the order of collimators 30-1, 31-1, 30-2, and 31-2, or in the order of collimators 31-2, 30-2, 31-1, and 30-1. Light may also be allowed to enter either the etalon 10-1 or 10-2 first. Additionally, if this concept is further developed, dispersion compensation for conducting corrections for such a higher-order dispersion ripple may use an element other than the etalon. An associated configuration is shown in FIG. 31. In this figure, a variable dispersion compensating unit 150 conducts corrections for the higher-order dispersion ripple. The variable dispersion compensating unit 150 can be an element that achieves a relatively small amount of dispersion. For example, it may be possible to use a conventional optical-fiber grating, a multi-cavity etalon, or a ring cavity. Alternatively, it may also be possible to use the photonic crystal or photonic crystal fiber that have been actively researched in recent years in anticipation of application to dispersion-compensating elements. The photonic crystal is a structure in which substances of different refractive indices are regularly and periodically arrayed with sizes not exceeding any wavelength of light. Since this crystal has a period not permitting light of a specific wavelength region to pass through, the crystal can confine the light inside it and the application of this crystal to the elements that give desired dispersion characteristics is anticipated. The photonic crystal fiber is an optical fiber with a cladding of a construction in which a large number of air holes are regularly arrayed. This fiber is also known to become able to provide great wavelength dispersion, compared with a normal fiber.

Figure 18:
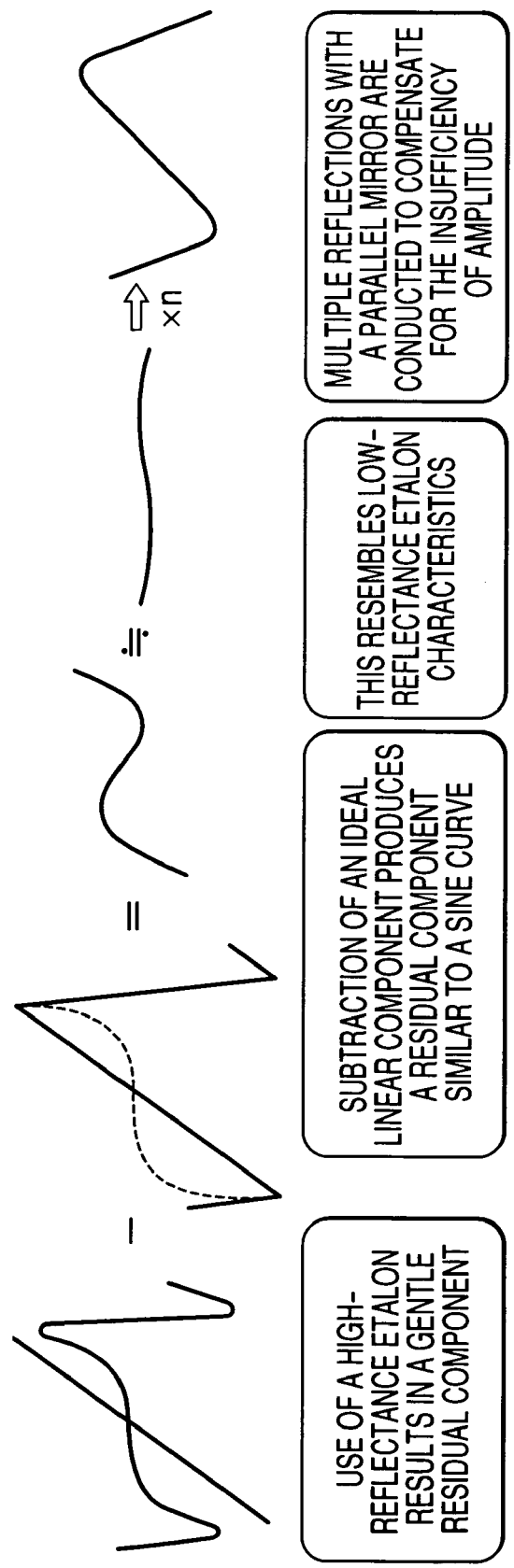
FIG. 18 is an explanatory diagram of the first embodiment of the present invention, showing the principles of operation of the plus-side variable dispersion compensating unit of the variable dispersion compensator in the invention.
Figure 19:
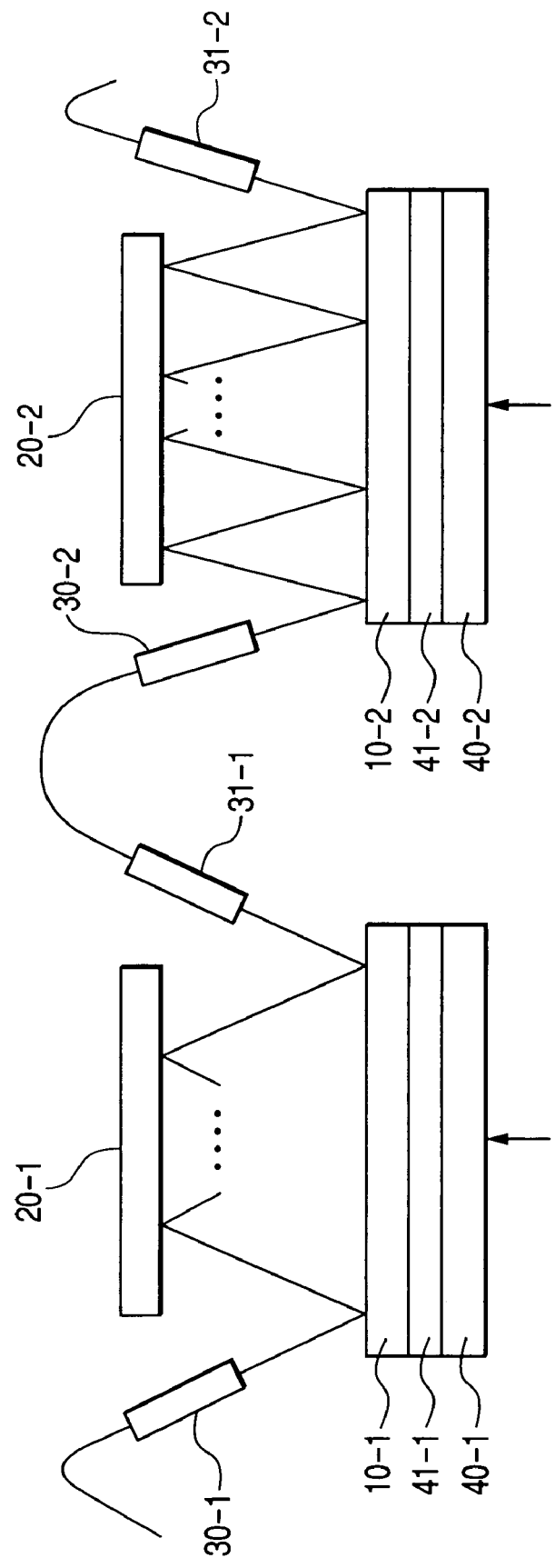
FIG. 19 is an explanatory diagram of the first embodiment of the present invention, showing a second configuration of the plus-side variable dispersion compensating unit of the variable dispersion compensator in the invention.
Figure 20:
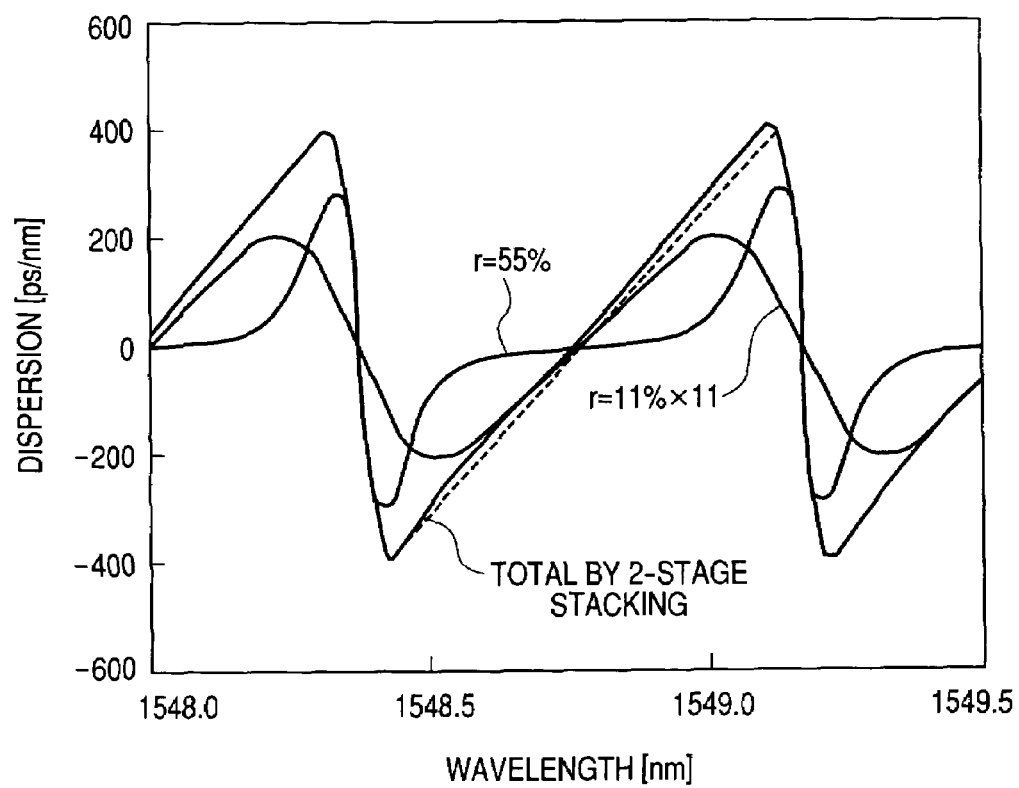
FIG. 20 is an explanatory diagram of the first embodiment of the present invention, showing the dispersion characteristics obtained in the second configuration of the plus-side variable dispersion compensating unit of the variable dispersion compensator in the invention.

Another example of improving the linearity of the portions of the negative gradient in the plus-side variable dispersion compensating unit by adopting a multi-stage configuration will be next shown. As shown in FIG. 8C, the etalon with a high reflectance has characteristics distorted from linear portions and consequently has a gentle residual component. A difference between these characteristics and ideal linearity (hereinafter, this difference is also called the higher-order dispersion ripple) takes a shape close to a sine curve, as mentioned in an example of the minus-side variable dispersion compensating unit. This difference is considered to take a shape close to that obtained when the etalon shown in FIG. 8A has a low reflectance. When the reflectance of the etalon is low, however, the amplitude of dispersion is also small, as mentioned above. To conduct corrections with the etalon of a low reflectance, therefore, the etalon and the mirror are to be arranged in parallel and plural reflections are conducted to double the amplitude. The above considerations and improvement method are schematically shown in FIG. 18. Next, the more specific configuration of the plus-side variable dispersion compensating unit that uses the method of FIG. 18, and associated calculation results on this compensating unit are shown in FIGS. 19 and 20, respectively. The results shown in FIG. 20 were obtained under the following configuration conditions. That is, the angles formed by etalons and mirrors are 0° (parallel arrangement), amplitude reflectances "r" of etalons 10-1 and 10-2 are 55% and 11%, respectively, and reflection is repeated 1 time and 11 times, respectively. As a result, a band of 86 GHz and $R^2$ of 0.99990 are obtainable. In the single-stage configurations shown in FIGS. 10 and 11, a band of 75 GHz and $R^2$ of 0.9994 are obtainable at "r"=25%". It can be seen from these results, therefore, that both the band and linearity are substantially improved.

Figure 32:
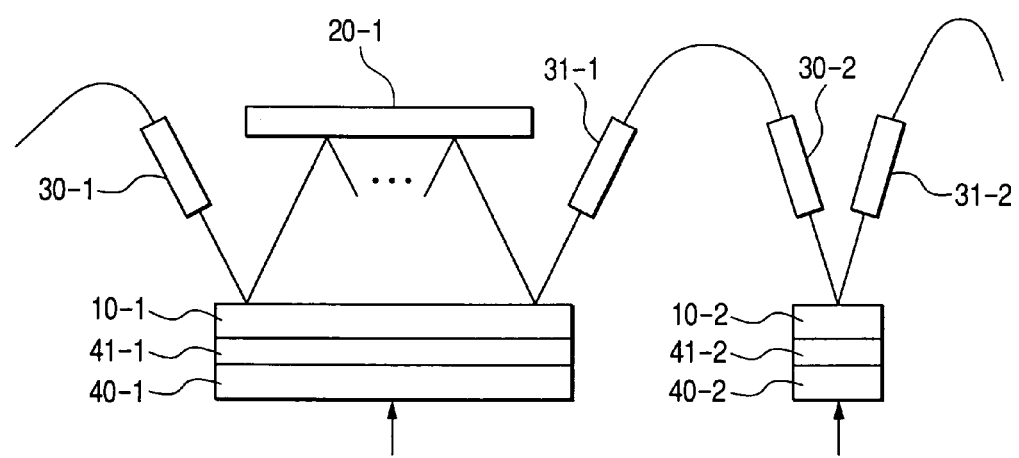
FIG. 32 is an explanatory diagram of the first embodiment of the present invention, showing a third configuration of the plus-side variable dispersion compensating unit of the variable dispersion compensator in the invention.
Figure 33:
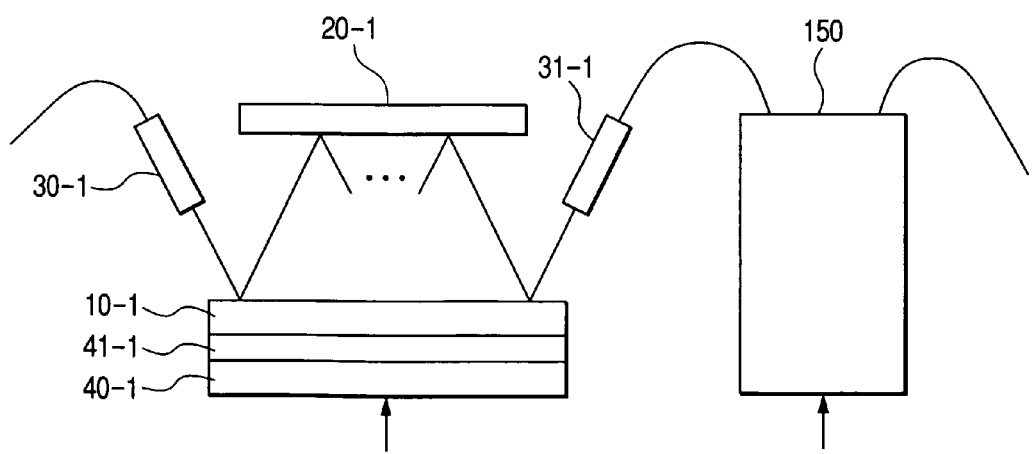
FIG. 33 is an explanatory diagram of the first embodiment of the present invention, showing a fourth configuration of the plus-side variable dispersion compensating unit of the variable dispersion compensator in the invention.

As can be seen from the above, the etalon with a high reflectance may need only to cause reflection one time. In this case, no mirrors are required since the etalon is not made to cause plural reflections. The configuration in this case is shown in FIG. 32. In addition, similarly to the configuration shown in FIG. 16, light may be passed through collimators 30-1, 31-1, 30-2, and 31-2, in that order, or collimators 31-2, 30-2, 31-1, and 30-1, in that order. Light may also be allowed to enter either the etalon 10-1 or 10-2 first. Additionally, if this concept is further developed, dispersion compensation for conducting corrections for such a higher-order dispersion ripple may use an element other than the etalon. An associated configuration is shown in FIG. 33. In this figure, a variable dispersion compensating unit 150 conducts corrections for the higher-order dispersion ripple. The variable dispersion compensating unit 150 can be an element that achieves a relatively small amount of dispersion. For example, it may be possible to use a conventional optical-fiber grating, a multi-cavity etalon, a ring cavity, a photonic crystal, or a photonic crystal fiber.

Since the band of the positive gradient can be extended in this way, the method previously described in FIG. 12 can also be used to construct minus-side variable dispersion compensating units by combining the plus-side variable dispersion compensating units of the configuration of FIG. 19, into a form having an even larger number of stages.

Figure 27:
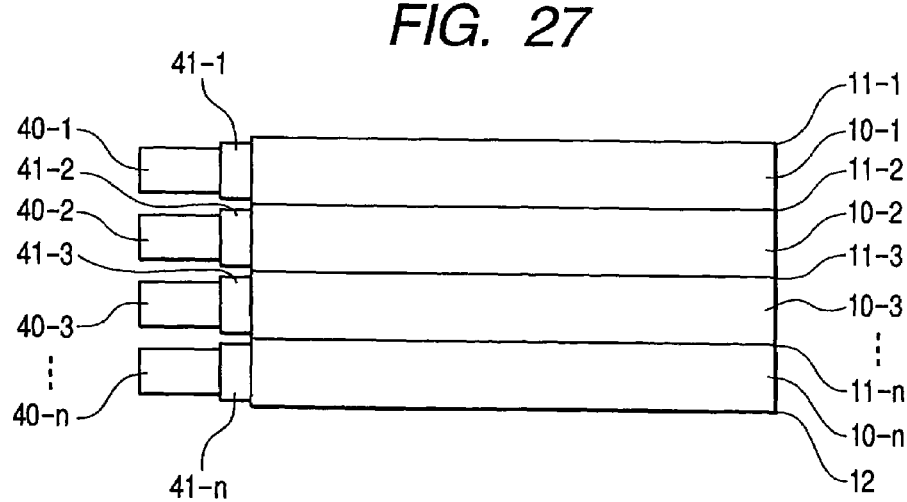
FIG. 27 is an explanatory diagram of the first embodiment of the present invention, showing a multi-cavity etalon serving as a basic element of the variable dispersion compensator in the invention.
Figure 28:
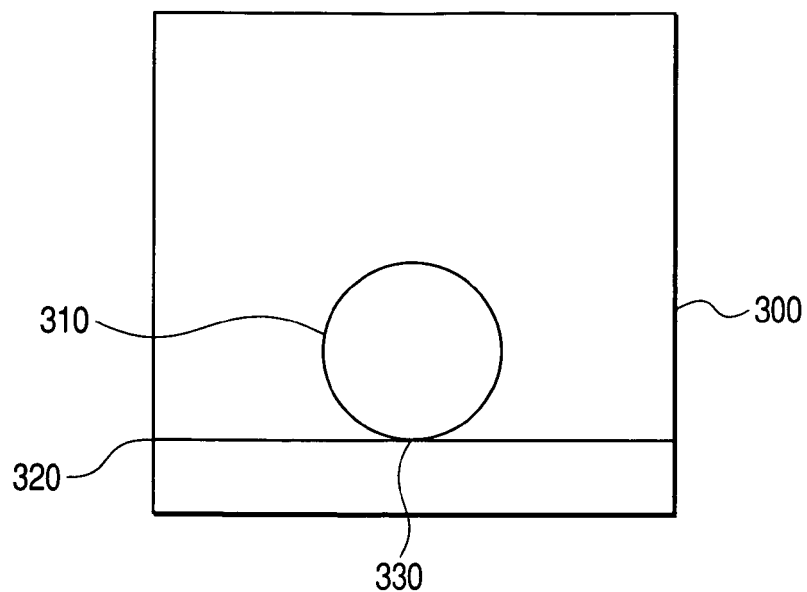
FIG. 28 is an explanatory diagram of the first embodiment of the present invention, showing a ring resonator serving as a basic element of the variable dispersion compensator in the invention.
Figure 29:
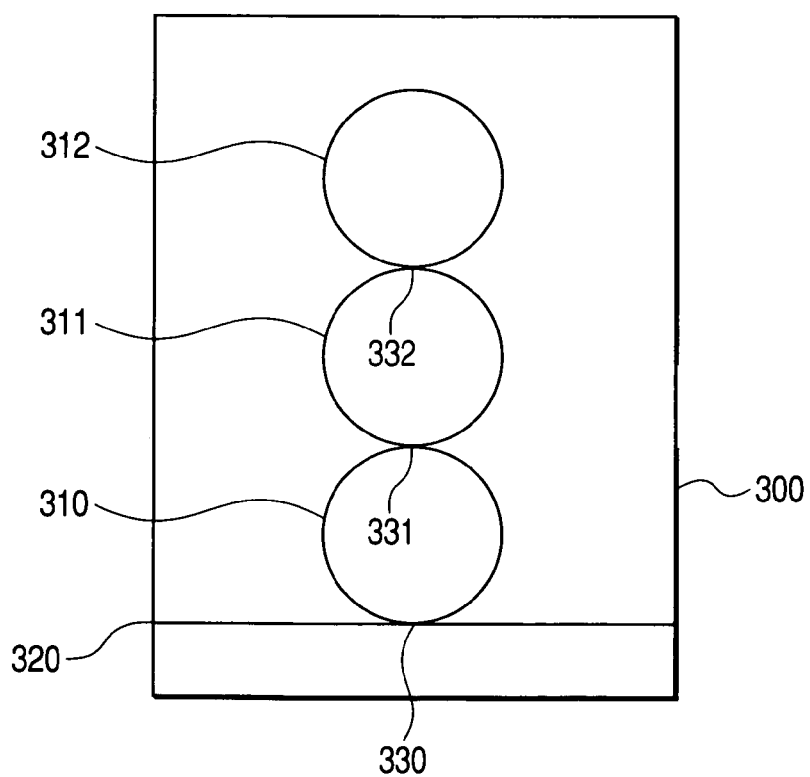
FIG. 29 is an explanatory diagram of the first embodiment of the present invention, showing a multi-stage ring resonator serving as a basic element of the variable dispersion compensator in the invention.

In addition, the etalon of FIG. 1, constructed with the single cavity having one resonance structure surrounded by the reflecting films 11 and 12, may be replaced with the multi-cavity etalon having plural resonance structures, shown in FIG. 27. The dispersion compensator can likewise be configured by using this method. The multi-cavity etalon shown in FIG. 27 has a structure with a planar plate 10 and a reflecting film 11 stacked alternately in multi-stage form, and varying each of these elements in reflectance makes the desired dispersion characteristics achievable since flexibility relative to that of the single-cavity etalon increases. In terms of reduction in the number of optical components required, a structure with a heat transfer material 41 and a temperature-changing element 40 laminated as a set at one end of a reflecting film 12 is preferable for temperature control of the multi-cavity etalon. A structure desirable in terms of finer temperature control, however, is such that as shown in FIG. 27, the heat transfer material 41 and the temperature-changing element 40 are laminated in an appropriate "n" number of sets at one end of each planar plate 10 according to an "n" number of multi-cavity etalon layers. In this figure, a temperature control element is in contact with an end of the planar plate 10. Further preferably, however, the temperature control element should be in contact so as to surround the planar plate 10. A further example of the present invention may use a ring cavity instead of the etalon. The expression used to represent delay characteristics of the ring cavity is the same as for the etalon, so the concept according to the present invention is applicable. A ring-cavity structure is shown in FIG. 28. The ring cavity shown in the figure includes an optical substrate 300, a ring-resonating element 310, an optical waveguide 320, and an optical coupler 330. The optical waveguide is higher than the substrate in terms of the refractive index of light, and the light is confined inside the waveguide and does not leak to the substrate. Incident light from the left of the waveguide travels to the right through the waveguide and reaches the optical coupler 330, at which the light is then divided into light that directly travels straight through the optical waveguide 320, and light that branches and partly travels toward the ring-resonating element 310. After the light has circulated the entire ring-resonating element 310 one time, a portion of the light travels straight through the optical coupler 330 and all other portions circulate the ring-resonating element 310 once again. In this way, the latter plural portions of light, after circulating the entire ring-resonating element 310 several times, are coupled together and then go out into the waveguide 320. A resonator is thus realized. It is also possible to form the ring-resonating element 310 and the optical coupler 330 into a multi-stage configuration, as shown in FIG. 29. Forming both elements in this way increases flexibility relative to that of a single-stage configuration, thus making the desired dispersion characteristics achievable.

Figure 21:
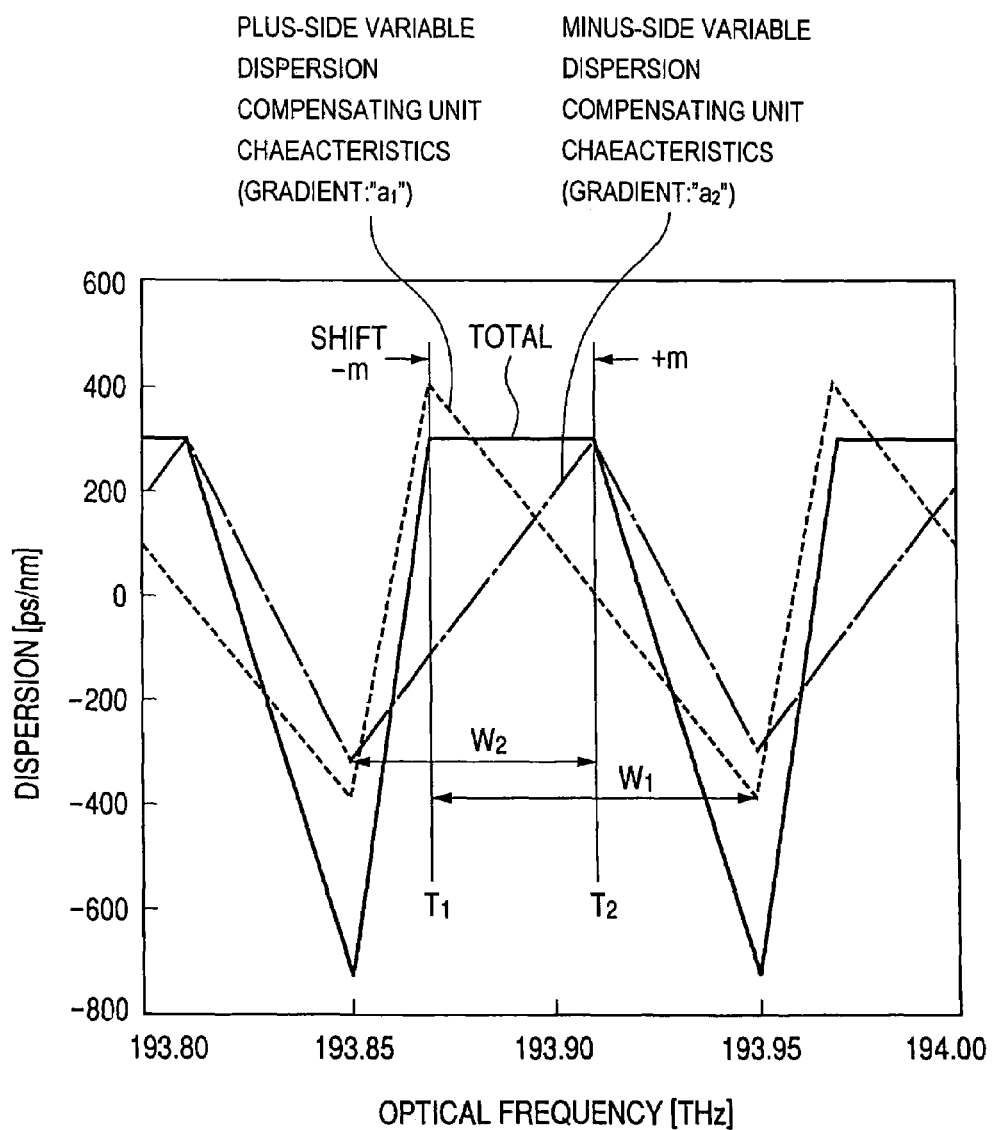
FIG. 21 is an explanatory diagram of the first embodiment of the present invention, showing control principles of the variable dispersion compensator in the invention.

A method of controlling the plus-side and minus-side variable dispersion compensating units according to the present invention will be next described. FIG. 21 shows an ideal linear model to describe the control method. The band of the positive gradient in the plus-side variable dispersion compensating unit is taken as $W_1$, and the band of the negative gradient in the minus-side variable dispersion compensating unit is taken as $W_2$. In FIG. 21, both bands are maintained in a relationship of $W_1 > W_2$. Also, the positive gradient in the plus-side variable dispersion compensating unit is taken as "$a_1$", and the negative gradient in the minus-side variable dispersion compensating unit is taken as "$a_2$." In order for the variable dispersion compensator to reduce the higher-order dispersion $$D_2 = \frac{dD}{d\lambda} \qquad \text{Numerical expression (7)}$$

to zero, gradients "$a_1$" and "$a_2$" must be of opposite signs and of the same absolute value. However, although, ideally, it is preferable that both gradients be the same in absolute value, differential relative quantities of $|(a_1-a_2)/a_1|$ down up to about 0.1 may be permissible in consideration of manufacturing-associated problems, differences in system, and other factors. Also, in FIG. 21, an optical frequency lowermost in the effective band of the variable dispersion compensator is taken as $T_1$, and an optical frequency uppermost in the effective band is taken as $T_2$.

Here, the amount of shifting that, as shown in FIG. 7, varies wavelength (optical frequency) characteristics is given to the plus-side and minus-side variable dispersion compensating units. As shown in FIG. 21, a minus sign is assigned to the amount of shifting, "m", to be given to one compensating unit, and a plus sign is assigned to the amount of shifting, "m", to be given to the other compensating unit. Directions of the signs are defined as "−m" and "+m" in this manner. For WDM optical transmission systems, each wavelength is prescribed by the grids specified in the International Telecommunication Union (ITU). A central wavelength of the variable dispersion compensator, therefore, must not change during control. In other words, a change in the central wavelength means narrowing the effective band. A control method for giving "m" so as not to change the central wavelength (optical frequency) is easy when $W_1 = W_2$. That is, the amounts of shifting are given to the plus-side and minus-side variable dispersion compensating units so that both amounts of shifting take the same absolute value and have opposite signs. At this time, suppose that the amounts of shifting given to the plus-side and minus-side variable dispersion compensating units are "−m" and "+m", respectively (in FIG. 21, directions in which two peaks are brought close to each other). In this case, although the total value shown in FIG. 21 applies to "m=0", since an overlapping portion becomes small, the characteristics of the entire dispersion compensator becomes narrow in band and increases in the amount of dispersion, as mentioned in FIG. 7. If the amount of shifting given to the plus-side variable dispersion compensating unit is "+m" and the amount of shifting given to the minus-side variable dispersion compensating unit is "−m", since an overlapping portion becomes large, the characteristics of the entire dispersion compensator becomes wide in band and decreases in the amount of dispersion. In the example of FIG. 21, however, since W1>W2, it is not good enough just to assign opposite signs when the amounts of shifting are given to the plus-side and minus-side variable dispersion compensating units. The reason for that is described below.

Figure 22:
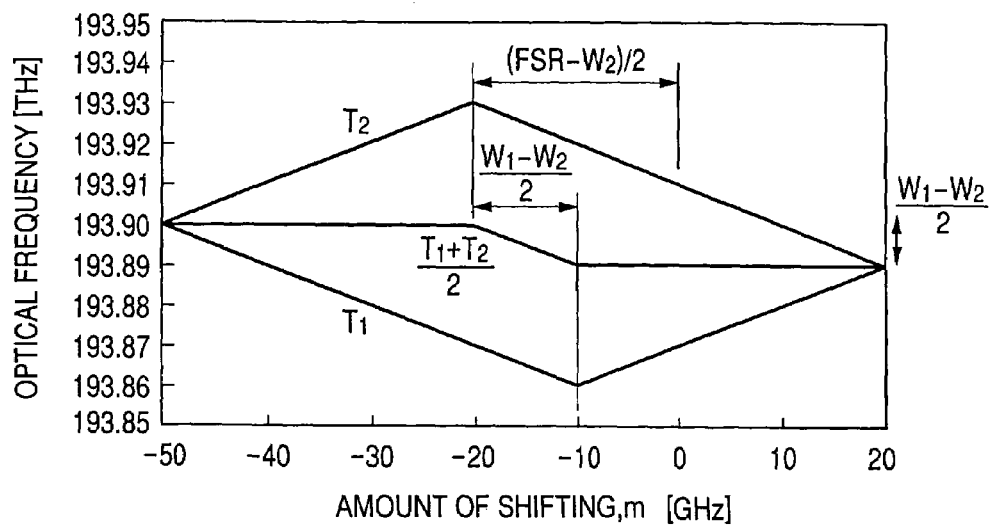
FIG. 22 is an explanatory diagram of the first embodiment of the present invention, showing the relationship between variations in the amount of shifting and effective band of the variable dispersion compensator in the invention.

The changes in $T_1$ and $T_2$ that result when the amount of shifting, "m", is changed when $W_1 > W_2$, and associated changes in an average value $T_c$ (central optical frequency) of the $T_1$ and $T_2$ values are shown in FIG. 22. At this time, the amounts of shifting are given to the plus-side and minus-side variable dispersion compensating units so that both amounts of shifting take the same absolute value and have opposite signs. In FIG. 22, FSR=100 [GHz], $W_1$=80 [GHz], and $W_2$=60 [GHz] are assigned as parameters. For "m"=−50 [GHz], both $T_1$ and $T_2$ are 193.90 THz and the effective band of the variable dispersion compensator is 0 GHz. Gradually increasing "m" causes $T_1$ and $T_2$ to decrease below or increase above 193.90 THz, and the respective changes are equal in absolute value. Accordingly, the central optical frequency is 193.90 THz, which is constant. However, since $W_1 > W_2$, if "m" exceeds $(W_2-FSR)/2$, $T_2$ starts decreasing and the central optical frequency also changes. This tendency continues until "m" has increased to $(W_2-FSR)/2+(W_1-W_2)/2=(W_2-FSR)/2$. Subsequently, as "m" increases, $T_1$ also starts increasing and the central optical frequency becomes constant at $(W_1-W_2)/2$. The relationship between "m" and a variation $\Delta T_c$ of the central optical frequency, shown in FIG. 22, can be expressed as follows:

Numerical expression (8)

$$\Delta T_c = \begin{cases} 0 & \left(m \le \dfrac{W_2 - FSR}{2}\right) \\ -\left(m + \dfrac{FSR - W_2}{2}\right) & \left(\dfrac{W_2 - FSR}{2} < m \le \dfrac{W_1 - FSR}{2}\right) \\ -\dfrac{W_1 - W_2}{2} & \left(\dfrac{W_1 - FSR}{2} < m\right) \end{cases}$$

The amounts of shifting that are to be given to the plus-side and minus-side variable dispersion compensating units to suppress the changes in the central optical frequency that occur when $W_1$ is not equal to $W_2$ are actually given using a parameter $m_{offset}$ as follows:

Amount of shifting that is given to the plus-side variable dispersion compensating unit: $-m \to m_{offset} - m$ Amount of shifting that is given to the minus-side variable dispersion compensating unit: $m \to m_{offset} + m$ where it can be seen from numerical expression (8) that the "$m_{offset}$" value for not changing the central optical frequency can be given as follows:

Numerical expression (9)

$$m_{offset} = \begin{cases} 0 & \left(m \le \dfrac{W_2 - FSR}{2}\right) \\ m + \dfrac{FSR - W_2}{2} & \left(\dfrac{W_2 - FSR}{2} < m \le \dfrac{W_1 - FSR}{2}\right) \\ \dfrac{W_1 - W_2}{2} & \left(\dfrac{W_1 - FSR}{2} < m\right) \end{cases}$$

Figure 23:
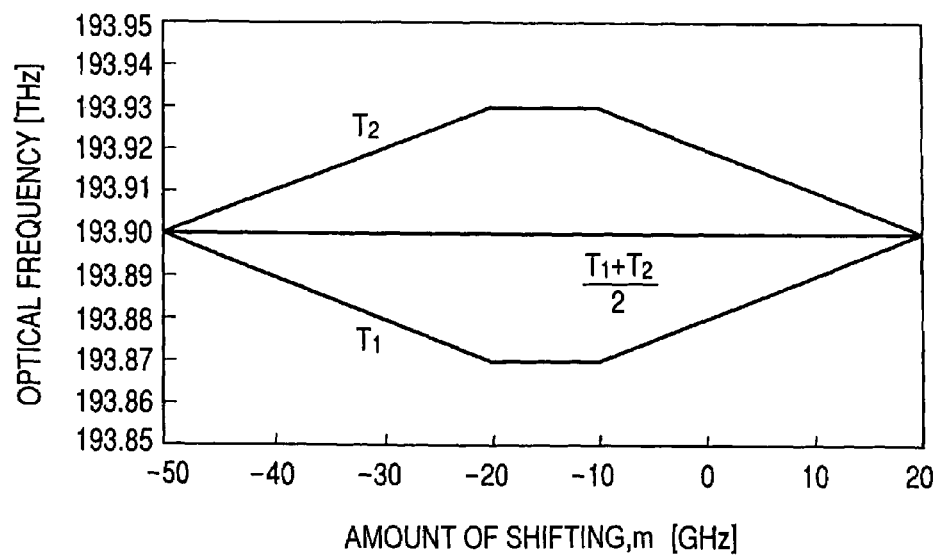
FIG. 23 is an explanatory diagram of the first embodiment of the present invention, showing an example of the shift quantity-effective band variation characteristics of the variable dispersion compensator, improved by adopting a control method.
Figure 24:
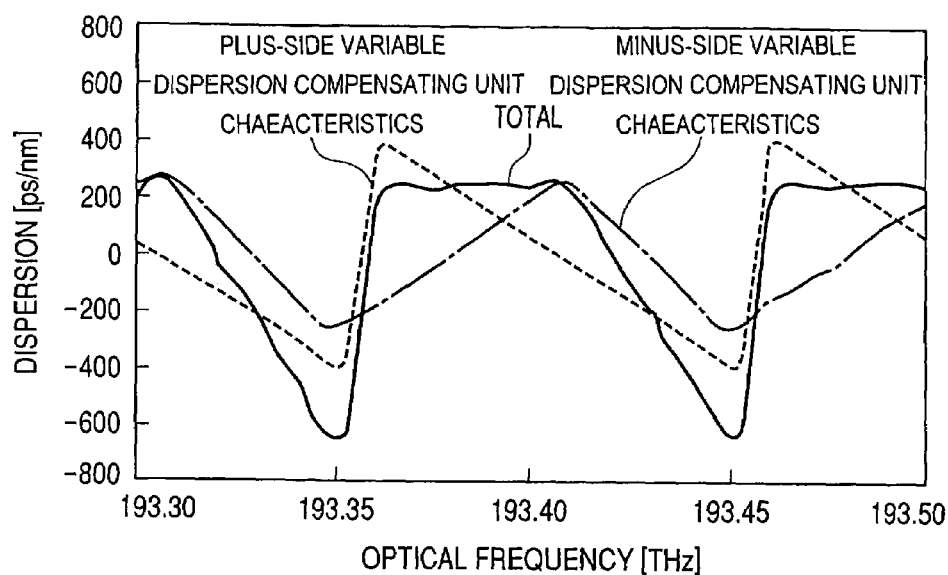
FIG. 24 is an explanatory diagram of the first embodiment of the present invention, showing the respective dispersion characteristics of the plus-side and minus-side variable dispersion compensating units of the variable dispersion compensator in the invention, and a total of the dispersion characteristics.
Figure 25:
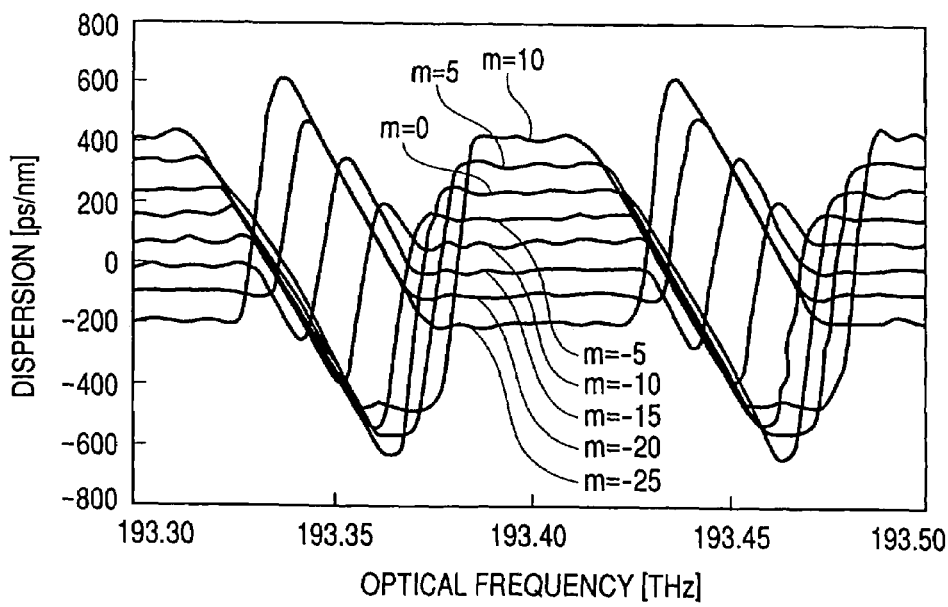
FIG. 25 is an explanatory diagram of the first embodiment of the present invention, showing the dispersion characteristics that the variable dispersion compensator in the invention exhibits.
Figure 26:
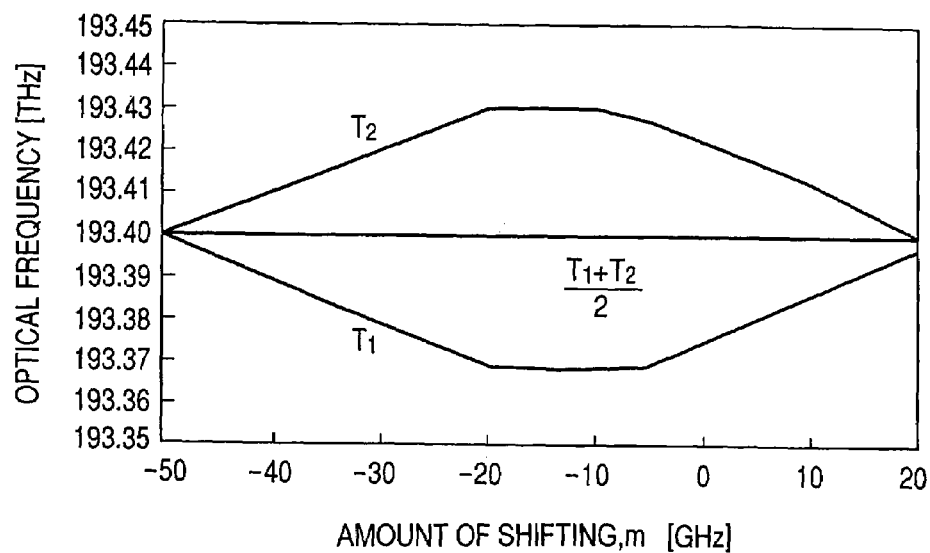
FIG. 26 is an explanatory diagram of the first embodiment of the present invention, showing another example of the shift quantity-effective band variation characteristics of the variable dispersion compensator, improved by adopting a control method.

The values that $T_1$ and $T_2$ take when this control method is executed, and the average value $T_c$ (central optical frequency) of $T_1$ and $T_2$ are shown in FIG. 23. It can be seen from this figure that $T_c$ is controlled to a constant value. The advantageous effects arising from using the characteristics of the plus-side and minus-side variable dispersion compensating units, obtained according to the present invention, not using ideal characteristics, are verified next. The characteristics of the plus-side and minus-side variable dispersion compensating units, obtained according to the present invention, and total data of these characteristics are shown in FIG. 24. This figure assumes FSR=100 GHz, $W_1$=86 GHz, and $W_2$=58 GHz. Changes in $T_1$, $T_2$, and $T_c$ are shown in FIG. 26. It can be seen from the above that the control method according to the present invention does not change the central frequency.

As described above, according to the present invention, it is possible to obtain a variable dispersion compensator that exhibits excellent characteristics, i.e., a low-dispersion ripple (low-group-delay ripple), a large amount of variable dispersion, and minimum changes in central wavelength, over a wide band.

Second Embodiment

In another variable dispersion compensator of the present invention, light is obliquely admitted into an etalon and then reflected between the etalon and a mirror several times before being received by a collimator. Therefore, excessive loss and an excessive loss ripple are caused by each reflection from the etalon. This phenomenon will be described using figures and numerical expressions.

Figure 34:
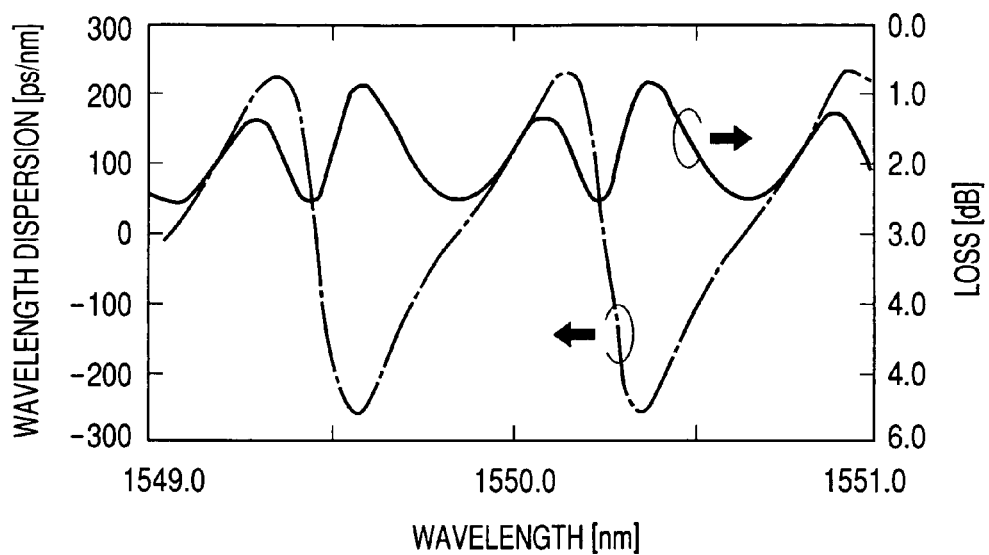
FIG. 34 is an explanatory diagram of a second embodiment of the present invention, showing a first relationship of a dispersion and loss of light in the plus-side variable dispersion compensating unit of the variable dispersion compensator of the invention with respect to wavelength.
Figure 35:
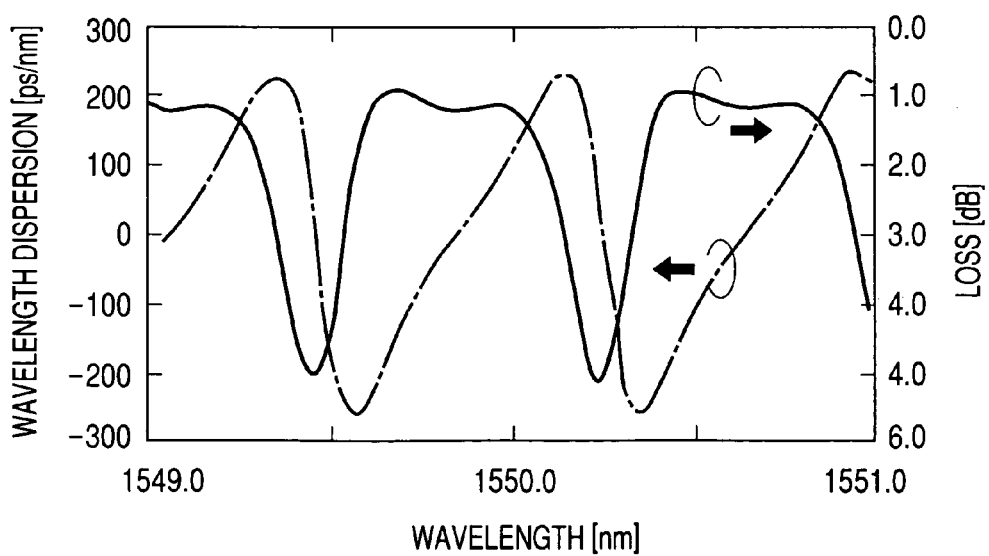
FIG. 35 is an explanatory diagram of the second embodiment of the present invention, showing a second relationship of a dispersion and loss of light in the plus-side variable dispersion compensating unit of the variable dispersion compensator of the invention with respect to wavelength.

Main examples of experimentally obtained wavelength characteristics and loss characteristics are shown in FIGS. 34 and 35. Differences between both figures are due to differences in horizontal positions of collimators. In experiments, total reflection from the mirror was repeated four times (k=4) with mirror angle $\Delta\theta$ set to be almost equal to 0. It can be seen that although FIGS. 34 and 35 do not differ too greatly in dependence of dispersion on wavelength, these figures significantly differ in dependence of loss on wavelength. The dispersion characteristics shown in FIGS. 34 and 35 are described first. These figures indicate that the dispersion characteristics have periodicity with respect to wavelength. This period is called the Free Spectral Range (FSR), which, in the figures, is 100 GHz (approx. 0.8 nm). The loss characteristics shown in FIGS. 34 and 35 are described next. The loss characteristics in FIG. 34 show a state in which, in the above range called the FSR, two peaks of equal height exist or maximum loss becomes a minimum. The loss characteristics in FIG. 35 show a state in which, although flat portions with small loss are present (hereinafter, this state is called the top-flat state), a significant decrease in loss is present in two places in the FSR.

Figure 36:
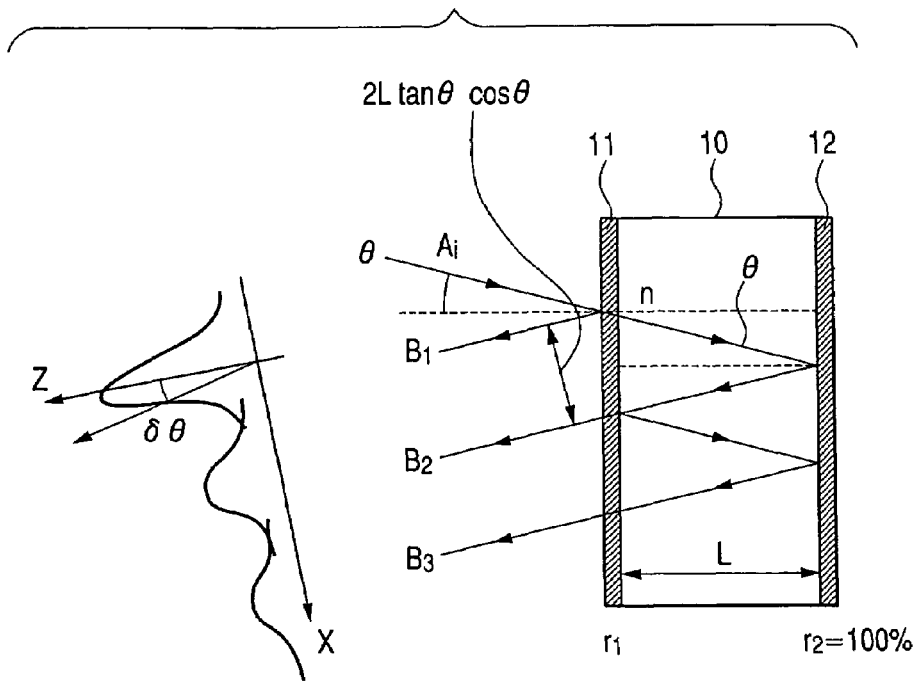
FIG. 36 is an explanatory diagram of the second embodiment of the present invention, showing a multi-path reflection inside the etalon of the variable dispersion compensator in the invention.

This phenomenon is described below using numerical expressions. Multi-path reflection inside the etalon of a variable dispersion compensator according to the present invention is shown in FIG. 36. As shown in this figure, during the multi-path reflection inside the etalon, incident light with amplitude $A_1$ causes the beams that have amplitudes $B_1$, $B_2$, $B_3$, etc. A phase shift between the beams of $B_1$ and $B_2$, $B_2$ and $B_3$, etc., that is, phase shift $\delta$ of the light shuttling inside the etalon one time is expressed as follows:

$$d = \frac{4\pi n L \cos\Theta}{\lambda}$$

where $\Theta$ is an angle of incidence of the light inside the etalon and $\lambda$ is a wavelength of the light. Also, amplitudes $B_1$, $B_2$, $B_3$, etc. of reflected return light are expressed as below from the relationship of the collimator coupling efficiency obtained when well-known paraxial ray approximation $\Theta \ll 1$ can be applied:

$$B_1 = r_1 \sqrt{\eta(x = x_0, \delta\theta = 0, z = z_0, \omega_1, \omega_2)} A_i$$

$$B_2 = (1 - r_1^2)e^{j\pi}e^{j\delta} \sqrt{\eta(x = x_0 + 2L\tan\Theta\cos\theta, \delta\theta = 0, z = z_0 + 2L, \omega_1, \omega_2)} A_i$$

$$B_3 = (1 - r_1^2)r_1 e^{j3\pi}e^{j2\delta} \sqrt{\eta(x = x_0 + 4L\tan\Theta\cos\theta, \delta\theta = 0, z = z_0 + 4L, \omega_1, \omega_2)} A_i$$

$$B_4 = (1 - r_1^2)r_1^2 e^{j5\pi}e^{j3\delta} \sqrt{\eta(x = x_0 + 6L\tan\Theta\cos\theta, \delta\theta = 0, z = z_0 + 6L, \omega_1, \omega_2)} A_i$$

where $\delta\theta$ denotes a shift in angle between the collimator and the reflected light, reference characters $\omega_1$ and $\omega_2$ denote radii of beam waists of the two collimators, and coupling efficiency $\eta$ is expressed as follows:

$$\eta(x, \delta\theta, z, \omega_1, \omega_2) = \kappa \exp\left[-\kappa\left\{\frac{x^2}{2}\left(\frac{1}{\omega_1^2} + \frac{1}{\omega_2^2}\right) + \frac{\pi^2\delta\theta^2}{2\lambda^2}(\omega_1^2(z) + \omega_2^2) - x\delta\theta\frac{z}{\omega_1^2}\right\}\right]$$

The $\kappa$ and $\omega_1(z)$ sections in the above expression of coupling efficiency $\eta$ are further represented as follows:

$$\kappa = \frac{4}{\left(\frac{\omega_1}{\omega_2} + \frac{\omega_2}{\omega_1}\right)^2 + \left(\frac{\lambda z}{\pi\omega_1\omega_2}\right)^2}, \quad \omega_1(z) = \omega_1\sqrt{1 + \left(\frac{\lambda z}{\pi\omega_1^2}\right)^2}$$

From these expressions, the total amplitude $A_r$ of the return light generated when the incident light is reflected from the etalon one time is finally represented by the following expression:

$$A_r = B_1 + B_2 + B_3 + \ldots$$

$$= \left\{ r_1 \sqrt{\eta(x = x_0, \delta\theta = 0, z = z_0, \omega_1, \omega_2)} + (1 - r_1^2)e^{j\pi}e^{j\delta} \sqrt{\eta(x = x_0 + 2L\tan\Theta\cos\theta, \delta\theta = 0, z = z_0 + 2L, \omega_1, \omega_2)} + (1 - r_1^2)r_1 e^{j3\pi}e^{j2\delta} \sqrt{\eta(x = x_0 + 4L\tan\Theta\cos\theta, \delta\theta = 0, z = z_0 + 4L, \omega_1, \omega_2)} + (1 - r_1^2)r_1^2 e^{j5\pi}e^{j3\delta} \sqrt{\eta(x = x_0 + 6L\tan\Theta\cos\theta, \delta\theta = 0, z = z_0 + 6L, \omega_1, \omega_2)} + \ldots \right\} A_i$$

$$= \left[ r_1 \sqrt{\eta(x = x_0, \theta = \delta\theta, z = z_0, \omega_1, \omega_2)} - (1 - r_1^2)\sum_{m=1} r_1^{m-1} e^{jm\delta} \sqrt{\eta(x = x_0 + 2mL\tan\Theta\cos\theta, \delta\theta = 0, z = z_0 + 2mL, \omega_1, \omega_2)} \right]$$

Figure 37A:
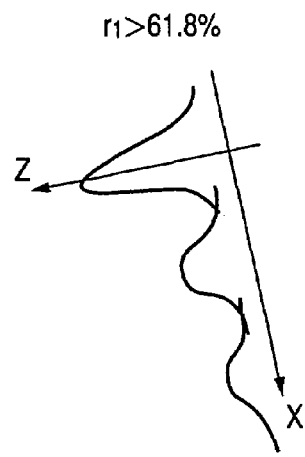
FIGS. 37A and 37B are explanatory diagrams of the second embodiment of the present invention, FIG. 37A showing an optical power level obtained by the multi-path reflection inside the etalon of the variable dispersion compensator in the invention, and FIG. 37B showing a relationship with a single-side amplitude reflectance "$r_1$" of the etalon.
Figure 37B:
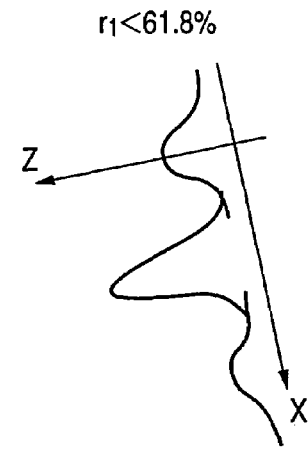

The relationship between amplitude reflectance "$r_1$" and $B_1$, $B_2$, etc., is described next. As shown in FIG. 37, $B_1 > B_2$ holds if "$r_1^2$" greater than $(3-\sqrt{5})/2$ and "$r_1$" is greater than 61.8%, and $B_2 > B_1$ holds if "$r_1^2$" is smaller than $(3-\sqrt{5})/2$ and "$r_1$" is smaller than 61.8%. Since the coupling efficiency of the collimator is a function of wavelength and collimator horizontal position, changing the horizontal position of the light-receiving collimator also changes the coupling efficiency with respect to wavelength, thus varying characteristics in terms of loss and loss ripple. Since a power distribution of the light after it has exited the etalon changes according to the magnitude of "$r_1$", in particular, the horizontal position of the light-receiving collimator needs to be determined to optimize the horizontal position according to the particular reflectance. It can be seen from these considerations that loss and a loss ripple can be suppressed under the optimum conditions of the collimator horizontal position where the loss ripple becomes a minimum, and by minimizing etalon incident angle $\theta$. The present inventors developed this concept to derive numerical expressions for the dependence between loss and wavelength, established by plural reflections in an opposed configuration of the mirror and etalon according to the present invention. That is, instead of etalon multi-path reflection being handled together, light is considered as independent beams, coupling efficiency is calculated for each beam, and a total of calculation results is derived. This procedure is described below using FIG. 38. For simplicity in the description, mirror angle $\Delta\theta$ is taken as 0.

Under this concept, total amplitude $A_{r_k}$ of the return light generated when reflection from the etalon is repeated a $(k+1)$ number of times is expressed as follows:

$$A_{r_k} = \sum_{i_1=1} \sum_{i_2=1} \cdots \sum_{i_{k+1}=1} B_{i_1, i_2, \ldots, i_{k+1}}$$

where 1 in "$B_{i_1, i_2, \ldots i_1, \ldots, i_{k+1}}$" denotes a coefficient of the beam derived by the first oblique reflection of incident light on the etalon, and "$i_1$" (natural number) represents the number of multi-path reflections inside the etalon.

When Kronecker $\delta$ function $$\delta_{ij} = \begin{cases} 1 & (i = j) \\ 0 & (i \neq j) \end{cases}$$

is used, "$B_{i_1, i_2, \ldots i_1, \ldots, i_{k+1}}$" is expressed as follows:

$$B_{i_1, i_2, \ldots, i_{k+1}} = (1 - r_1^2)^{(k+1-\sum_{i=1}^{k+1}\delta_{1,i_1})} r_1^{\sum_{i=1}^{k+1}(2\delta_{1,i_1}+i_1-2)} (-1)^{\sum_{i=1}^{k+1}\delta_{1,i_1}} e^{j(-(k+1)+\sum_{i=1}^{k+1}i_1)\delta} \times$$

$$\sqrt{\eta\left(x_0 + 2\left(-(k+1) + \sum_{i=1}^{k+1} i_i\right)L\tan\Theta\cos\theta, \delta\theta, z_0 + \frac{2\left(-(k+1) + \sum_{i=1}^{k+1} i_i\right)L}{\cos\Theta}, \omega_1, \omega_2\right)} A_i$$

It is possible to calculate "$B_{i_1, i_2, \ldots, i_1, \ldots, i_{k+1}}$" for each wavelength component and to calculate total amplitude $A_{i_k}$ of the light similarly to etalon single reflection.

Figure 39:
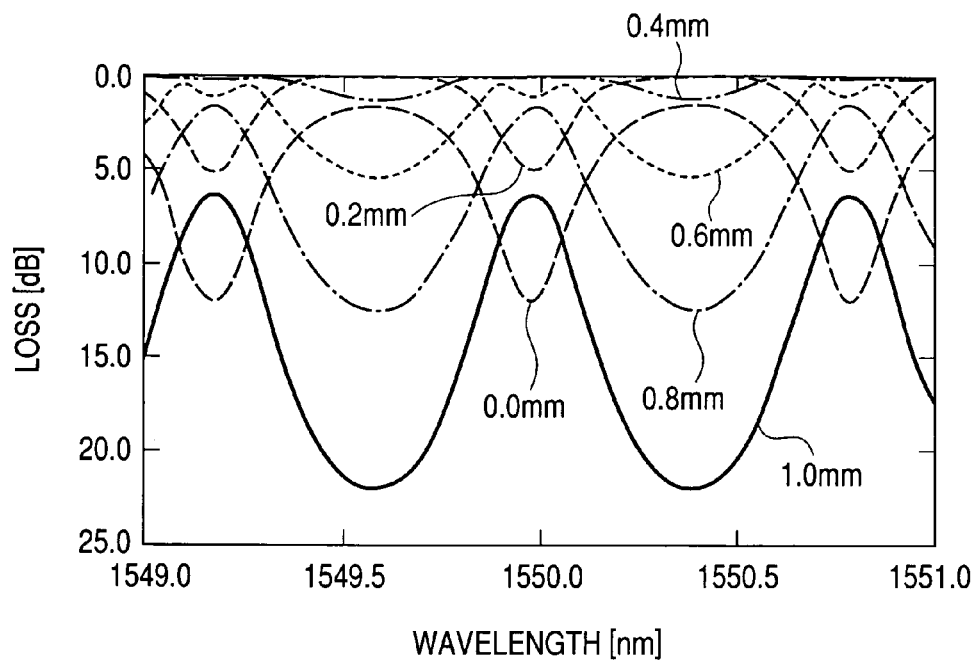
FIG. 39 is an explanatory diagram of the second embodiment of the present invention, showing the loss-versus-wavelength relationship established when a horizontal position of a collimator is changed using the variable dispersion compensator of the invention.
Figure 40:
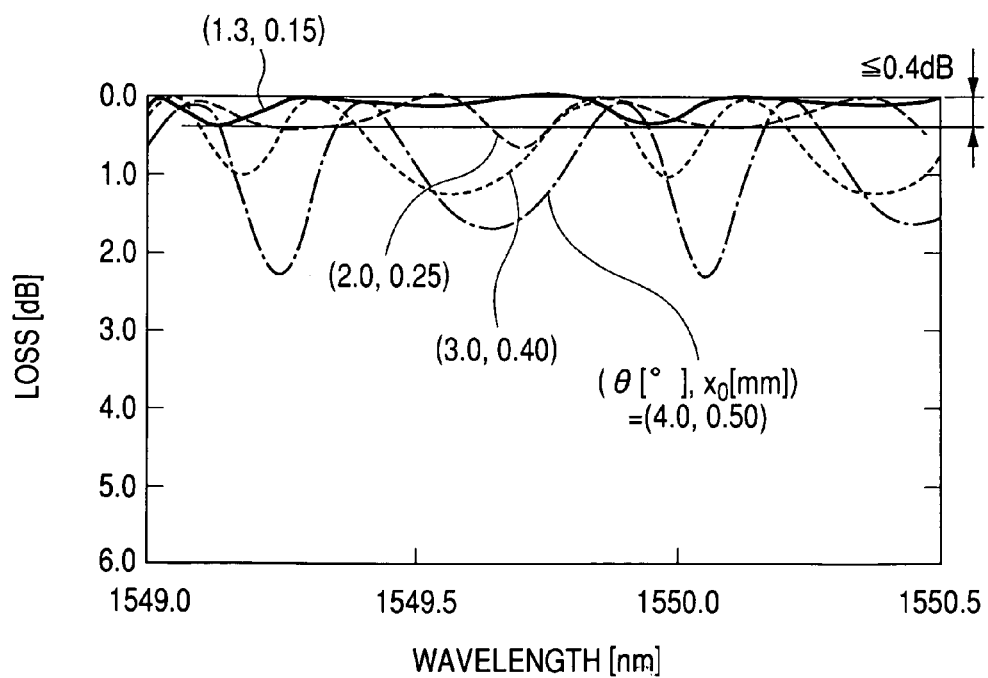
FIG. 40 is an explanatory diagram of the second embodiment of the present invention, showing a loss-versus-wavelength ripple suppression effect of the variable dispersion compensator of the invention.

The thus-derived dependence between loss and wavelength is shown in FIGS. 39 and 40. In FIG. 39, horizontal position "$x_0$" of the collimator is changed in a 0.0-1.0 mm range. This figure indicates that as "$x_0$" is increased, the top-flat state in which the maximum achievable coupling efficiency is not of a preferable level (i.e., minimum loss does not decrease to 0 dB) changes to a state in which the loss characteristics have two peaks of equal height, and that this state further changes to the inverted status of the loss characteristics that has one recessed peak.

Next, how the loss characteristics behave when etalon incident angle θ is changed is shown in FIG. 40. A state in which the etalon incident angle is minimized with respect to a loss ripple to minimize maximum loss (i.e., to obtain the state having two peaks of equal height) by simultaneously changing "$x_0$" also, is selected in the figure that shows the behavior. As a result, it is seen that the loss ripple can be reduced by minimizing etalon incident angle θ at selected optimum horizontal position "$x_0$" of the collimator.

Important factors leading to the present invention are derived from the study results that use the above numerical expressions. That is, to reduce loss and the loss ripple, it is important first to take the smallest possible incident angle θ. More specifically, it is necessary to (1) reduce a size of the mirror to such an extent that adjacent beams do not overlap, and to (2) ensure a mirror-to-etalon distance substantially equal to or less than a working distance of the collimator. A numerical expression for representing these requirements is shown below assuming that minimum loss can be obtained at a, working distance "$l_{WD}$" of both two collimators. When an average distance between the mirror and the etalon is taken as "h" (the average distance here refers to average height from both end points of the mirror to the etalon), a distance between a first collimator and the etalon, as "$a_1$", a distance between a second collimator and the etalon, as "$a_2$", and the number of reflections at the etalon, as N, "$l_{WD}$" is expressed in the following:

$l_{WD}$ is almost equal to or larger than the quantity of $(a_1+a_2+2(N-1)h)$.

Additionally, the optimal collimator horizontal position "$x_s$" for minimizing the loss ripple is present, and in consideration of beam spreading by the low-reflection etalon, therefore, the light-receiving collimator position is shifted horizontally so as to match a gravitational position of the beam at a light-receiving portion. This position for an "$r_1$" value of about 25%, for example, can be expressed in an approximated fashion as follows:

[Horizontal amount of shift]≈2 NL tan Θ

Figure 41:
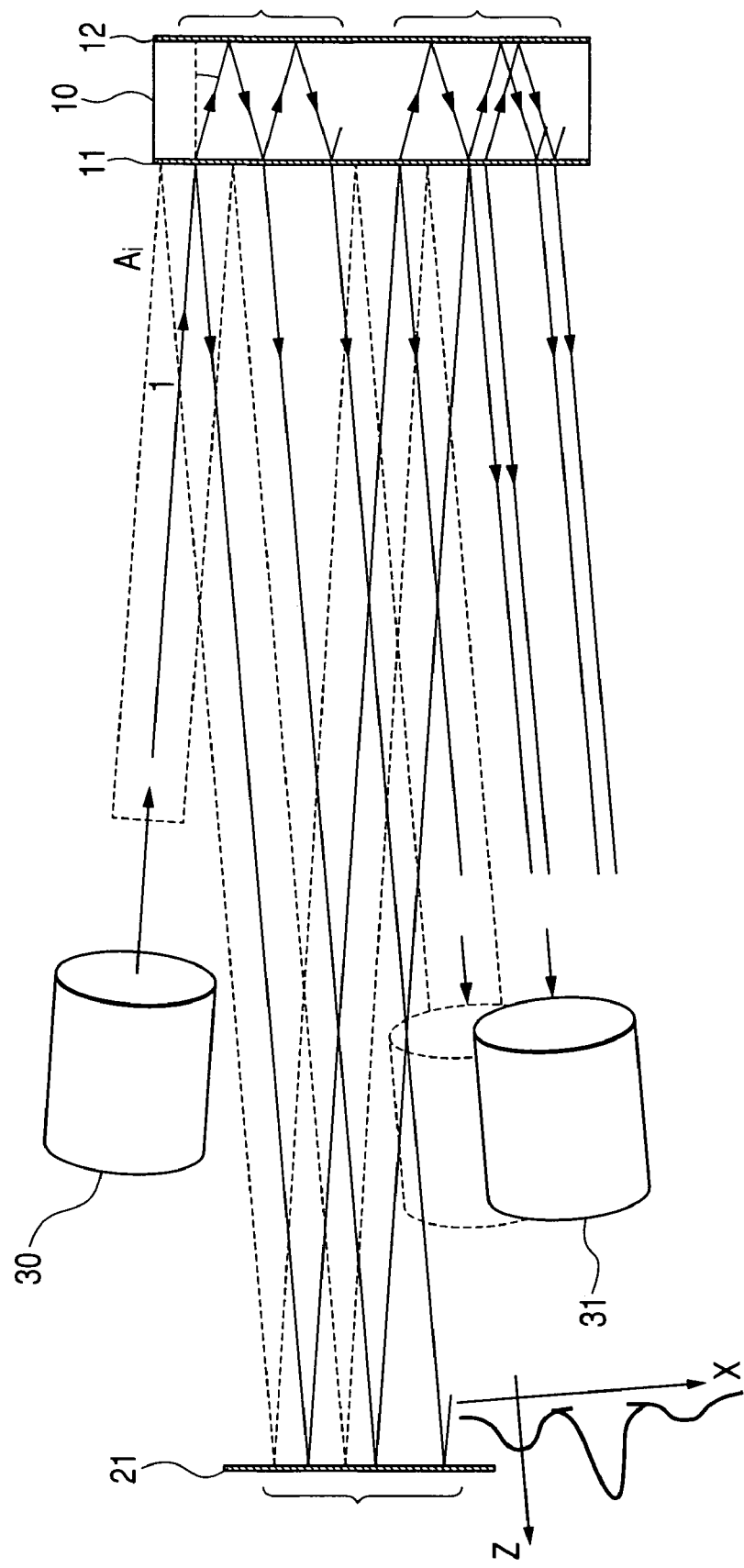
FIG. 41 is an explanatory diagram of the second embodiment of the present invention, showing in detail the principles of operation of the variable dispersion compensator in the invention.
Figure 42:
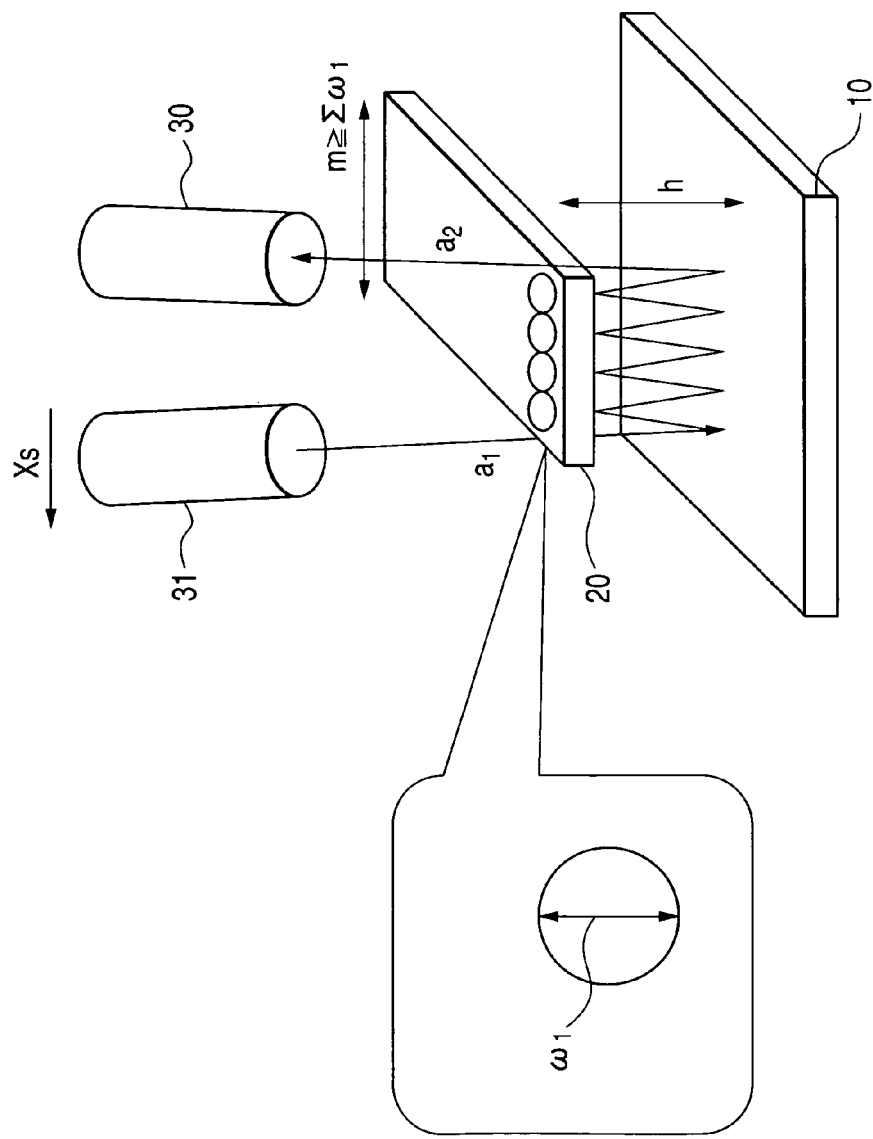
FIG. 42 is an explanatory diagram of the second embodiment of the present invention, showing in detail the configuration of the variable dispersion compensator in the invention and the relationship in position between the optical components constituting the compensator.

In consideration of an even lower reflectance, the horizontal amount of shift would need to be increased, preferably to 4 NL tan Θ, twice the above value. This relationship of horizontal positions is shown in FIG. 41. As shown in FIG. 41, when the light-receiving collimator is centered with respect to an optical axis of the first reflected light generated after exit light from the emitting collimator has reflected between a reflecting film and the mirror through the shortest possible optical distance, loss deterioration and a loss ripple occur as previously mentioned. This is because the above collimator center deviates from an optical axis of the most powerful light if amplitude reflectance "$r_1$"≦61.8%. In order to suppress the deterioration, therefore, the center of the light-receiving collimator with respect to the optical axis of the first reflected light is displaced through required distance "$x_s$" in the direction where the center of the collimator becomes more spaced from that of the emitting collimator. Preferable required distance "$x_s$" is considered to range from 0 to 4 NL tan Θ, as shown in FIG. 41. The configuration of the variable dispersion compensator according to the present invention, and the relationship between relative positions of the optical components of the compensator and length of the mirror are shown in FIG. 42. An effective beam diameter of the beam repeatedly reflected from the mirror after being emitted from the collimator is defined as "$\omega_1$" in FIG. 42. The length "M" of the mirror may be shorter than the length obtained by summing the beam diameter "$\omega_1$" as often as the beam is reflected from the mirror. This means beam overlapping. In this case, beams different in the number of reflections at the etalon enter the light-receiving collimator at the same time, so that a group delay time of the compensator does not meet the relationship shown in numerical expression (3). In order to avoid this state, therefore, length "M" of the mirror must be increased to the same value as $\Sigma\omega_k$ (this is achieved when the beams are brought closest to one another) or slight margins must be provided to achieve length "M" greater than $\Sigma\omega_k$. In addition, since it is desirable that as previously mentioned, the angle of incidence from the collimator on the etalon should be minimized to suppress loss and the loss ripple, length "M" of the mirror should be as small as possible, preferably, the same as $\Sigma\omega_k$.

Figure 38:
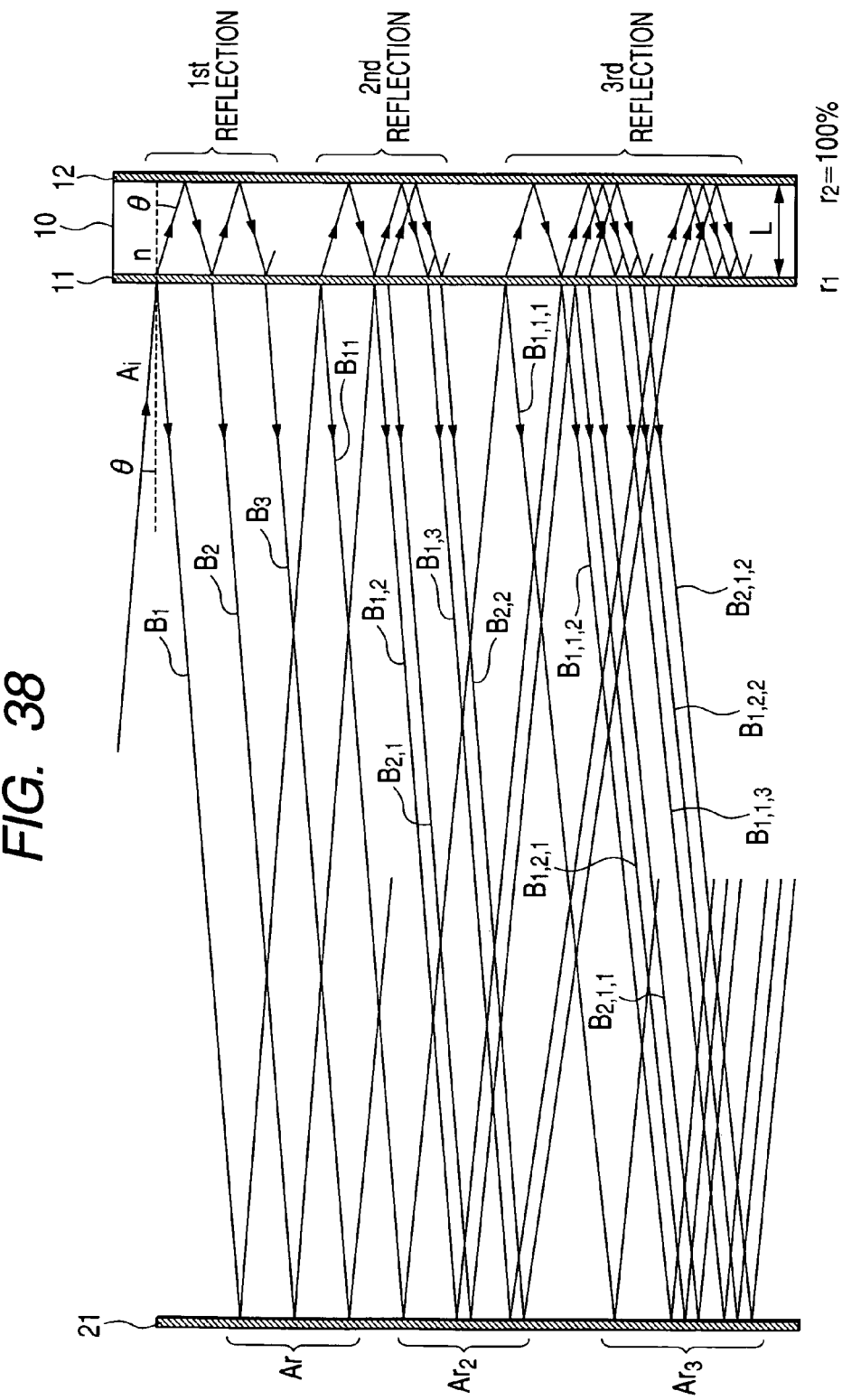
FIG. 38 is an explanatory diagram of the second embodiment of the present invention, showing the multi-path reflection repeated under opposed mirror/etalon construction of the variable dispersion compensator in the invention.

Also, as shown in FIG. 38, the beams of light that have repeated reflecting between the mirror and the etalon in alternate form are already made asymmetric in a horizontal direction by the influence of etalon multi-path reflection. The asymmetry reduces coupling efficiency when the collimator receives the light. It is known that such asymmetricity of the beams of light can be corrected for using nonspherical lenses. Coupling efficiency can therefore be improved by further adding the optics consisting mainly of a nonspherical lens(es).

Figure 43:
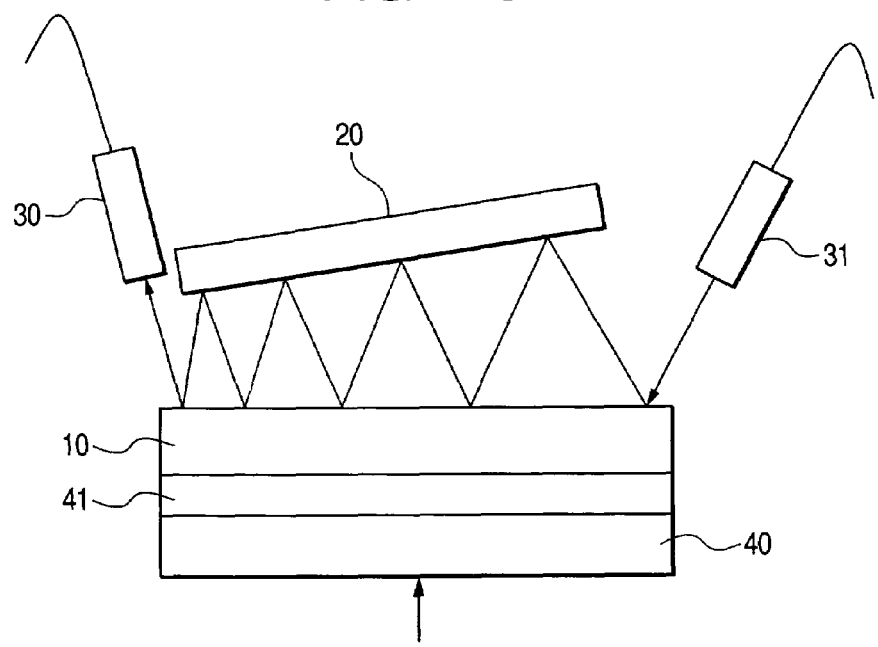
FIG. 43 is an explanatory diagram of the second embodiment of the present invention, showing a second configuration of the variable dispersion compensator in the invention.

The studies that have been conducted heretofore in this Specification apply when the etalon and the mirror are parallel to each other. A case in which the mirror angle Δθ is not 0 is described next. In this case, as the etalon incident $\theta_i$ is reduced, the influence of beam spreading by the etalon can be made less significant. This means that admitting a collimator-emitted beam of light in the direction where the angle of incidence of the beam initially decreases and is subsequently reduced by reflection from the mirror makes it possible to correspondingly reduce beam spreading at the collimator that finally receives the light. It can be seen, therefore, that loss can be reduced by admitting light in the direction shown in FIG. 43. The present inventors experimentally confirmed that at a mirror angle Δθ of about 0.08°, loss due to admission in the beam direction shown in FIG. 43 decreases by about 1 dB in comparison with loss due to admission in an inverse direction.

Figure 44:
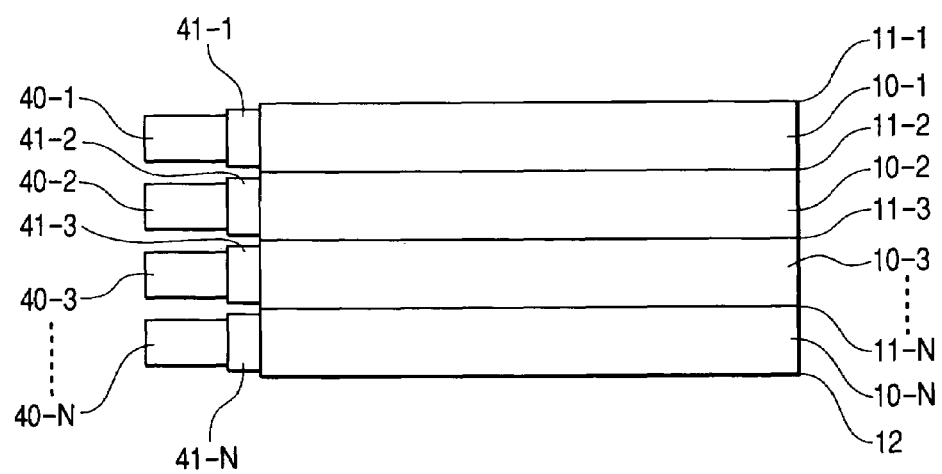
FIG. 44 is an explanatory diagram of the second embodiment of the present invention, showing a multi-cavity etalon serving as a basic element of the variable dispersion compensator in the invention.

Also, while the etalon shown in FIG. 1 is of the single-cavity configuration with one resonance structure surrounded by the reflecting films 11 and 12, the dispersion compensator may be constructed by substituting this etalon by the multi-cavity etalon having plural resonance structures, shown in FIG. 44. In the multi-cavity etalon of FIG. 44 that has a structure with a planar plate 10 and a reflecting film 11 stacked alternately in multi-stage form, varying each of these elements in reflectance makes desired dispersion characteristics achievable since flexibility relative to that of the single-cavity etalon increases. In terms of reduction in the number of optical components required, a structure with a heat transfer material 41 and a temperature-changing element 40 laminated as a set at one end of a reflecting film 12 is preferable for temperature control of the multi-cavity etalon. A structure-desirable in terms of finer temperature control, however, is such that as shown in FIG. 44, the heat transfer material 41 and the temperature-changing element 40 are laminated in an appropriate "N" number of sets at one end of each planar plate 10 according to an "N" number of multi-cavity etalon layers. In this figure, a temperature control element is in contact with an end of the planar plate 10. Further preferably, however, the temperature control element should be in contact so as to surround the planar plate 10.

As described above, according to the present invention, it is possible to obtain a variable dispersion compensator that exhibits excellent characteristics, i.e., a low-dispersion ripple (low-group-delay ripple), a large amount of variable dispersion, and minimum changes in central wavelength, over a wide band.

The technical ideas, other than claims, that can be comprehended from the above embodiments of the present invention are described next.

(1) A variable dispersion compensator, comprising:

a first variable dispersion compensating unit including a plate-like first etalon with opposed first and second planes, and a first mirror with a first reflection plane, wherein the second plane of the first etalon and the first reflection plane of the first mirror are arranged facing each other and inclined at a first angle; and a second variable dispersion compensating unit including a plate-like second etalon with opposed third and fourth planes, and a second mirror with a second reflection plane, wherein the fourth plane of the second etalon and the second reflection plane of the second mirror are inclined at a second angle and arranged facing each other;

wherein:

the first plane has a reflectance equal to or smaller than 100%, but not smaller than 90%, and the second plane has a reflectance lower than the reflectance of the first plane;

the third plane has a reflectance equal to or smaller than 100% and not smaller than 90%, and the fourth plane has a reflectance lower than the reflectance of the third plane;

the second angle is equal to or greater than the first angle; and the reflectance of the fourth plane is equal to or greater than the reflectance of the second plane.

(2) The variable dispersion compensator according to item (1), wherein:

the second plane has a maximum reflecting capability of 90% as its reflectance;

the fourth plane has a maximum reflecting capability of 90% as its reflectance;

the reflectance of the reflection plane of the first mirror is equal to or smaller than 100% and not smaller than 90%;

the reflectance of the reflection plane of the second mirror is equal to or smaller than 100% and not smaller than 90%; and after a beam of light has been admitted from an interspace between the second plane and the first reflection plane, then reflected once or a plurality of times in alternate form between the first etalon and the first mirror, and caused to exit the interspace between the second plane and the first reflection plane, the beam of light is further admitted from an interspace between the fourth plane and the second reflection plane, then reflected once or a plurality of times in alternate form between the second etalon and the second mirror, and caused to exit the interspace between the fourth plane and the second reflection plane, and thus, wavelength dispersion is given to one or plural optical signals each of a different wavelength.

(3) The variable dispersion compensator according to item (1), wherein wavelength dispersion is given to one or plural optical signals each of a different wavelength by reversing the admission and exit order of the beam of light.

(4) The variable dispersion compensator according to item (1), wherein:

first temperature-adjusting means for giving temperature changes to the first etalon is provided in proximity thereto; and second temperature-adjusting means for giving temperature changes to the second etalon is provided in proximity thereto.

(5) The variable dispersion compensator according to item (1), wherein at least either the first or second etalon is a multi-cavity etalon.

(6) The variable dispersion compensator according to item (1), wherein at least either the first or second etalon is substituted by a ring cavity.

(7) The variable dispersion compensator according to item (1), wherein the first and second angles are equal to or smaller than 1 degree.

(8) The variable dispersion compensator according to item (4), wherein at least either the first temperature-adjusting means or the second temperature-adjusting means is equal to or greater than 5° C. in temperature control range.

(9) The variable dispersion compensator according to item (4), wherein at least either the first or second etalon has its substrate constructed of a glass member whose thermal expansion coefficient is equal to or smaller than $10^{-4}$ and not smaller than $10^{-6}$.

(10) A variable dispersion compensator, comprising:

a first variable dispersion compensating unit including a plate-like first etalon with opposed first and second planes, and a first mirror with a first reflection plane, wherein the second plane of the first etalon and the first reflection plane of the first mirror are arranged facing each other and inclined at a first angle; and a second variable dispersion compensating unit including a plate-like second etalon with opposed third and fourth planes, and a second mirror with a second reflection plane, wherein the fourth plane of the second etalon and the second reflection plane of the second mirror are arranged facing each other and inclined at a second angle;

wherein:

the reflectance of the first plane is equal to or smaller than 100% and not smaller than 90%, and the reflectance of the second plane is smaller than the reflectance of the first plane;

the reflectance of the third plane is equal to or smaller than 100% and not smaller than 90%, and the reflectance of the fourth plane is smaller than the reflectance of the third plane; and after a beam of light has been admitted from an interspace between the second plane and the first reflection plane, then reflected a natural number of "$n_1$" times in alternate form between the first etalon and the first mirror, and caused to exit the interspace between the second plane and the first reflection plane, the beam of light is further admitted from an interspace between the fourth plane and the second reflection plane, then reflected a natural number of "$n_2$" times in alternate form between the second etalon and the second mirror, and caused to exit the interspace between the fourth plane and the second reflection plane, and thus when the reflectance of the fourth plane is equal to or greater than the reflectance of the second plane and the natural number of "$n_2$" is equal to or smaller than the natural number of "$n_1$", wavelength dispersion is given to one or plural optical signals each of a different wavelength.

(11) The variable dispersion compensator according to item (10), wavelength dispersion is given to one or plural optical signals each of a different wavelength by reversing the admission and exit order of the beam of light.

(12) The variable dispersion compensator according to item (10), wherein:

first temperature-adjusting means for giving temperature changes to the first etalon is provided in proximity thereto; and second temperature-adjusting means for giving temperature changes to the second etalon is provided in proximity thereto.

(13) The variable dispersion compensator according to item (10), wherein at least either the first or second etalon is a multi-cavity etalon.

(14) The variable dispersion compensator according to item (10), wherein at least either the first or second etalon is substituted by a ring cavity.

(15) The variable dispersion compensator according to item (10), wherein the first and second angles are equal to or smaller than 1 degree.

(16) The variable dispersion compensator according to item (12), wherein at least either the first temperature-adjusting means or the second temperature-adjusting means is equal to or greater than 5° C. in temperature control range.

(17) The variable dispersion compensator according to item (12), wherein at least either the first or second etalon has its substrate constructed of a glass member whose thermal expansion coefficient is equal to or smaller than $10^{-4}$ and not smaller than $10^{-6}$.

(18) A variable dispersion compensator, comprising:

a plus-side variable dispersion compensating unit having, in a relational expression representing a dispersion relative to wavelength, a positive gradient "$a_1$" and an effective band $W_1$ of the gradient "$a_1$";

a minus-side variable dispersion compensating unit having, in the relational expression representing the dispersion relative to wavelength, a negative gradient "$a_2$" and an effective band $W_2$ of the gradient "$a_2$";

first temperature-adjusting means that shifts dispersion characteristics of the plus-side variable dispersion compensating unit in a wavelength direction; and second temperature-adjusting means that shifts dispersion characteristics of the minus-side variable dispersion compensating unit in a wavelength direction inverse to that of the plus-side variable dispersion compensating unit;

wherein the gradients "$a_1$" and "$a_2$" have signs opposite to each other and have the same absolute quantity or equal to or smaller than 0.1 in a differential relative quantity $|(a_1-a_2)/a_1|$ between the gradients.

(19) The variable dispersion compensator according to item (18), wherein, if the amount of shifting in an optical frequency direction for adjustment of dispersion characteristics is taken as "m", the amount of offset shifting, as "$m_{offset}$", and a wavelength period of the plus-side variable dispersion compensating unit, as "FSR" (Free Spectral Range):

the amount of shifting of dispersion characteristics of the plus-side variable dispersion compensating unit, in the wavelength direction, by the first temperature-adjusting means, is given as ($m_{offset}-m$);

the amount of shifting of dispersion characteristics of the minus-side variable dispersion compensating unit, in the wavelength direction, by the second temperature-adjusting means, is given as ($m_{offset}+m$); and when "m" is equal to or less than "$(W_2-FSR)/2$", "$m_{offset}$" is set to be equal to 0, when "m" is greater than "$(W_2-FSR)/2$" and equal to or less than "$(W_1-FSR)/2$", "$m_{offset}$" is set to be equal to "$m+(FSR-W_2)/2$", and when "m" is greater than "$(W_1-FSR)/2$", "$m_{offset}$" is set to be equal to "$(W_1-W_2)/2$".

(20) A variable dispersion compensator, comprising:

a first variable dispersion compensating unit including a plate-like first etalon with opposed first and second planes, and a mirror with a reflection plane, wherein the second plane of the first etalon and the reflection plane of the mirror are arranged facing each other and inclined at an angle; and a second variable dispersion compensating unit optically connected to the first variable dispersion compensating unit, wherein the second variable dispersion compensating unit has the dispersion characteristics that cancel a higher-order dispersion ripple of the optical signal emitted from the first variable dispersion compensating unit.

(21) The variable dispersion compensator according to item (20), wherein the second etalon of item (1) is used in the second variable dispersion compensating unit.

(22) The variable dispersion compensator according to item (21), wherein at least either the first etalon of the first variable dispersion compensating unit or a second etalon of the second variable dispersion compensating unit is a multi-cavity etalon.

(23) The variable dispersion compensator according to item (21), wherein at least the first etalon of the first variable dispersion compensating unit or a second etalon of the second variable dispersion compensating unit is substituted by a ring cavity.

(24) The variable dispersion compensator according to item (20), wherein a fiber-grating dispersion compensating element is used in the second variable dispersion compensating unit.

(25) The variable dispersion compensator according to item (20), a photonic-crystal dispersion compensating element is used in the second variable dispersion compensating unit.

(26) The variable dispersion compensator according to item (20), wherein:

the second variable dispersion compensating unit includes a plate-like second etalon with opposed third and fourth planes;

the first plane has a reflectance equal to or smaller than 100% and not smaller than 90%, and the second plane has a reflectance lower than the reflectance of the first plane;

the third plane has a reflectance equal to or smaller than 100% and not smaller than 90%, and the fourth plane has a reflectance lower than the reflectance of the third plane; and the reflectance of the fourth plane is equal to or greater than the reflectance of the second plane.

(27) The variable dispersion compensator according to item (26), wherein wavelength dispersion is given to one or plural optical signals each of a different wavelength by reversing the admission and exit order of the beam of light.

(28) The variable dispersion compensator according to item (26), wherein:

first temperature-adjusting means for giving temperature changes to the first etalon is provided in proximity thereto; and second temperature-adjusting means for giving temperature changes to the second etalon is provided in proximity thereto.

(29) The variable dispersion compensator according to item (20), wherein the angle of inclination is equal to or smaller than 1 degree.

(30) The variable dispersion compensator according to item (28), wherein at least either the first temperature-adjusting means or the second temperature-adjusting means is equal to or greater than 5° C. in temperature control range.

(31) The variable dispersion compensator according to item (28), wherein at least either the first or second etalon has its substrate constructed of a glass member whose thermal expansion coefficient is equal to or smaller than $10^{-4}$ and not smaller than $10^{-6}$.

(32) The variable dispersion compensator according to item (20), wherein:

the second variable dispersion compensating unit includes a plate-like second etalon with opposed third and fourth planes;

the first plane has a reflectance equal to or smaller than 100% and not smaller than 90%, and the second plane has a reflectance lower than the reflectance of the first plane;

the third plane has a reflectance equal to or smaller than 100% and not smaller than 90%, and the fourth plane has a reflectance lower than the reflectance of the third plane; and after a beam of light has been admitted from an interspace between the second plane and the reflection plane and reflected a natural number of "n" times in alternate form between the first etalon and the first mirror, the beam of light is further reflected on the fourth plane and thus when the reflectance of the fourth plane is equal to or greater than the reflectance of the second plane, wavelength dispersion is given to one or plural optical signals each of a different wavelength.

(33) The variable dispersion compensator according to item (32), wherein wavelength dispersion is given to one or plural optical signals each of a different wavelength by reversing the admission and exit order of the beam of light.

(34) The variable dispersion compensator according to item (32), wherein:

first temperature-adjusting means for giving temperature changes to the first etalon is provided in proximity thereto; and second temperature-adjusting means for giving temperature changes to the second etalon is provided in proximity thereto.

(35) The variable dispersion compensator according to item (32), wherein the angle of inclination is equal to or smaller than 1 degree.

(36) The variable dispersion compensator according to item (34), wherein at least either the first temperature-adjusting means or the second temperature-adjusting means is equal to or greater than 5° C. in temperature control range.

(37) The variable dispersion compensator according to item (34), wherein at least either the first or second etalon has its substrate constructed of a glass member whose thermal expansion coefficient is equal to or smaller than $10^{-4}$ and not smaller than $10^{-6}$.

(38) A variable dispersion compensator, comprising:

a first collimator for admitting a beam of light from an interspace between a second plane of a plate-like etalon and a reflection plane of a mirror, the etalon having a first plane opposed to the second plane, the second plane of the etalon and the reflection plane of the mirror being inclined at angle $\Delta\theta$;

a second collimator for receiving the beam after the beam has been reflected in alternate form between the etalon and the mirror, then further reflected a natural number of N times on the etalon, and caused to exit the interspace between the second plane and the reflection plane;

wherein, when a width of the mirror is taken as "m" and an effective beam diameter of the beam reflected the k-th time by the mirror is taken as $\omega_k$, "m" and $\omega_k$ are represented by a relational expression of "$m \geq \Sigma \omega_k$", and when an angle of incidence inside the etalon is $\Theta$ and a position at which a loss of the light becomes a minimum when the second plane of the etalon is taken as a total-reflecting mirror in a virtual fashion is defined as a home position of the second collimator, the second collimator is moved away from the first collimator horizontally through a distance "$x_s$" from the home position and the distance "$x_s$" is greater than 0, but smaller than 4NL tan $(\Theta)$ where L is a thickness of the etalon, and wavelength dispersion is given to one or plural optical signals each of a different wavelength.

(39) The variable dispersion compensator according to item (38), wherein temperature-adjusting means for giving temperature changes to the etalon is provided in proximity thereto.

(40) The variable dispersion compensator according to item (38), wherein the etalon is a multi-cavity etalon.

(41) The variable dispersion compensator according to item (38), wherein the angle $\Delta\theta$ is equal to or smaller than 1 degree.

(42) The variable dispersion compensator according to item (39), wherein a temperature control range of the temperature-adjusting means is from a minimum of 5° C. to a maximum of 60° C.

(43) The variable dispersion compensator according to item (39), wherein a substrate for constituting the etalon is constructed of a glass member whose thermal expansion coefficient is equal to or smaller than $10^{-4}$ and not smaller than $10^{-6}$.

(44) A variable dispersion compensator, comprising:

a first collimator for admitting a beam of light from an interspace between a second plane of a plate-like etalon and a reflection plane of a mirror, the etalon having a first plane opposed to the second plane, the second plane of the etalon and the reflection plane of the mirror being inclined at angle $\Delta\theta$;

a second collimator for receiving the beam after the beam has been reflected in alternate form between the etalon and the mirror, then further reflected a natural number of N times on the etalon, and caused to exit the interspace between the second plane and the reflection plane;

wherein an angle of admission of the beam into the etalon lowers with each reflection therefrom, and thus, wavelength dispersion is given to one or plural optical signals each of a different wavelength.

(45) The variable dispersion compensator according to item (44), wherein temperature-adjusting means for giving temperature changes to the etalon is provided in proximity thereto.

(46) The variable dispersion compensator according to item (44), wherein the etalon is a multi-cavity etalon.

(47) The variable dispersion compensator according to item (44), wherein the angle $\Delta\theta$ is equal to or smaller than 1 degree.

(48) The variable dispersion compensator according to item (44), wherein the collimator is substituted by a non-spherical lens and corrects a beam power distribution.

(49) The variable dispersion compensator according to item (45), wherein a temperature control range of the temperature-adjusting means is from a minimum of 5° C. to a maximum of 60° C.

(50) The variable dispersion compensator according to item (45), wherein a substrate for constituting the etalon is constructed of a glass member whose thermal expansion coefficient is equal to or smaller than $10^{-4}$ and not smaller than $10^{-6}$.

The meanings of the reference numbers used in the drawings accompanying this application are as follows: 10 . . . Planar plate, 20 . . . Mirror (substrate), 11, 12, 21 . . . Reflecting films, 30, 31 . . . Collimators, 40 . . . Temperature-changing element, 41 . . . Heat transfer material, 100 . . . Variable dispersion compensator, 110 . . . Input port, 120 . . . Output port, 130 . . . Plus-side variable dispersion compensating unit, 140 . . . Minus-side variable dispersion compensating unit, 150 . . . Variable dispersion compensating unit, 200 . . .

Optics-fixing member, 300 . . . Optical substrate, 310, 311, 312 . . . Ring-resonating elements, 320 . . . Optical waveguide, 330, 331, 332 . . . Optical coupler.

What is claimed is:

1. A variable dispersion compensator, comprising:
   a plus-side variable dispersion compensating unit having, in a relational expression representing a dispersion relative to wavelength, a positive gradient "$a_1$" and an effective band $W_1$ of the gradient "$a_1$";
   a minus-side variable dispersion compensating unit having, in the relational expression representing the dispersion relative to wavelength, a negative gradient "$a_2$" and an effective band $W_2$ of the gradient "$a_2$";
   first temperature-adjusting means that shifts dispersion characteristics of said plus-side variable dispersion compensating unit, in a wavelength direction; and
   second temperature-adjusting means that shifts dispersion characteristics of said minus-side variable dispersion compensating unit, in a wavelength direction inverse to that of said plus-side variable dispersion compensating unit;
   wherein the gradients "$a_1$" and "$a_2$" have signs opposite to each other and have the same absolute quantity or equal to or smaller than 0.1 in differential relative quantity $|(a_1-a_2)/a_1|$ between the gradients.

2. The variable dispersion compensator according to claim 1, wherein, if the amount of shifting in an optical frequency direction for adjustment of dispersion characteristics is taken as "m", the amount of offset shifting, as "$m_{offset}$", and a wavelength period of said plus-side variable dispersion compensating unit, as "FSR" (Free Spectral Range):
   the amount of shifting of dispersion characteristics of said plus-side variable dispersion compensating unit, in the wavelength direction, by said first temperature-adjusting means, is given as ($m_{offset}-m$);
   the amount of shifting of dispersion characteristics of said minus-side variable dispersion compensating unit, in the wavelength direction, by said second temperature-adjusting means, is given as ($m_{offset}+m$); and
   when "m" is equal to or less than "$(W_2-FSR)/2$", "$m_{offset}$" is set to be equal to 0, when "m" is greater than "$(W_2-FSR)/2$" and equal to or less than "$(W_1-FSR)/2$", "$m_{offset}$" is set to be equal to "$m+(FSR-W_2)/2$" and when "m" is greater than "$(W_1-FSR)/2$", "$m_{offset}$" is set to be equal to "$(W_1-W_2)/2$."

3. A variable dispersion compensator, comprising:
   a first collimator for admitting a beam of light from an interspace between a second plane of a plate-like etalon and a reflection plane of a mirror, the etalon having a first plane opposed to the second plane, the second plane of the etalon and the reflection plane of the mirror being inclined at angle $\Delta\theta$;
   a second collimator for receiving the beam after the beam has been reflected in alternate form between the etalon and the mirror, then further reflected a natural number of N times on the etalon, and caused to exit the interspace between the second plane and the reflection plane;
   wherein, when a width of said mirror is taken as "m" and an effective beam diameter of the beam reflected the k-th time by said mirror is taken as $\omega_k$, "m" and $\omega_k$ are represented by a relational expression of "$m \geq \Sigma\omega_k$", and when an angle of incidence inside said etalon is $\Theta$ and a position at which a loss of the light becomes a minimum when the second plane of said etalon is taken as a total-reflecting mirror in a virtual fashion is defined as a home position of said second collimator, said second collimator is moved away from said first collimator horizontally through a distance "$x_s$" from the home position and the distance "$x_s$" is greater than 0, but smaller than 4NL tan($\Theta$) where L is a thickness of said etalon, and wavelength dispersion is given to one or plural optical signals each of a different wavelength.

4. The variable dispersion compensator according to claim 3, wherein:
   the dispersion compensator includes:
   a first collimator for emitting a beam of light to a plate-like etalon having the first plane and a second plane opposed to the first plane; and
   a second collimator for receiving the beam after the beam has been reflected once on the second plane;
   when a position of said second collimator at which a loss of the light becomes a minimum with the second plane of said etalon being taken as a total-reflecting mirror in a virtual fashion is defined as a home position of said second collimator, said second collimator is moved away from said first collimator horizontally through a distance "$x_s$" from the home position and the distance "$x_s$" is greater than 0, but smaller than 4L tan($\Theta$) where L is a thickness of said etalon; and
   wavelength dispersion is given to one or plural optical signals each of a different wavelength.

5. The variable dispersion compensator according to claim 3, wherein the distance "$x_s$" is set so that an optical power distribution of the beam emitted from said etalon becomes a maximum in a central portion of said second collimator.

6. The variable dispersion compensator according to claim 3, wherein the distance "$x_s$" is set so that minimum loss becomes a maximum.

7. The variable dispersion compensator according to claim 3, wherein the distance "$x_s$" is set for minimum loss ripple.

8. The variable dispersion compensator according to claim 3, wherein:
   respective reflection films are formed on the first and second planes;
   a reflectance of the reflection film formed on the second plane does not exceed 61.8%.

9. The variable dispersion compensator according to claim 3, wherein said collimator is substituted by a nonspherical lens and corrects a beam power distribution.

* * * * *